（12） United States Patent
Suzuki et al.

(10) Patent No.: US 12,344,912 B2
(45) Date of Patent: Jul. 1, 2025

(54) STEEL SHEET AND MANUFACTURING METHOD THEREOF

(71) Applicant: NIPPON STEEL CORPORATION, Tokyo (JP)

(72) Inventors: Yuya Suzuki, Tokyo (JP); Kengo Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 534 days.

(21) Appl. No.: 17/792,112

(22) PCT Filed: Jan. 12, 2021

(86) PCT No.: PCT/JP2021/000703
§ 371 (c)(1),
(2) Date: Jul. 11, 2022

(87) PCT Pub. No.: WO2021/145310
PCT Pub. Date: Jul. 22, 2021

(65) Prior Publication Data
US 2023/0059951 A1    Feb. 23, 2023

(30) Foreign Application Priority Data
Jan. 14, 2020  (JP) ................................. 2020-003677

(51) Int. Cl.
*C21D 9/46*      (2006.01)
*B32B 15/01*    (2006.01)
(Continued)

(52) U.S. Cl.
CPC .............. *C21D 9/46* (2013.01); *B32B 15/013* (2013.01); *C21D 6/004* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C22C 38/001* (2013.01); *C22C 38/002* (2013.01);
(Continued)

(58) Field of Classification Search
None
See application file for complete search history.

(56) References Cited

U.S. PATENT DOCUMENTS

| 2011/0036465 | A1* | 2/2011 | Kawasaki ............. C22C 38/002 148/333 |
| 2017/0130286 | A1 | 5/2017 | Hayashi |
| 2019/0168822 | A1 | 6/2019 | Saito |

FOREIGN PATENT DOCUMENTS

| CN | 102605240 A | 7/2012 |
| WO | WO 2009/099251 A1 | 8/2009 |

(Continued)

*Primary Examiner* — Jenny R Wu
(74) *Attorney, Agent, or Firm* — Birch, Stewart, Kolasch & Birch, LLP

(57) ABSTRACT

In the present invention, provided is a steel sheet having a predetermined chemical composition and a metallographic structure, in which A/B, which is a ratio of a length A of an interface between epitaxial ferrite and ferrite to a length B of an interface between the epitaxial ferrite and martensite in a cross section that is along a rolling direction and perpendicular to a surface of the steel sheet at a position of ¼ of a sheet thickness from the surface of the steel sheet is more than 1.5, a ratio of a major axis to a minor axis of the martensite is 5.0 or more, and a tensile strength is 980 MPa or more.

16 Claims, 1 Drawing Sheet

(51) Int. Cl.
  *C21D 6/00* (2006.01)
  *C21D 8/02* (2006.01)
  *C22C 38/00* (2006.01)
  *C22C 38/02* (2006.01)
  *C22C 38/06* (2006.01)
  *C22C 38/20* (2006.01)
  *C22C 38/24* (2006.01)
  *C22C 38/26* (2006.01)
  *C22C 38/28* (2006.01)
  *C22C 38/30* (2006.01)
  *C22C 38/32* (2006.01)
  *C22C 38/44* (2006.01)
  *C22C 38/58* (2006.01)
  *C23C 2/02* (2006.01)
  *C23C 2/40* (2006.01)

(52) U.S. Cl.
  CPC .......... *C22C 38/005* (2013.01); *C22C 38/008* (2013.01); *C22C 38/02* (2013.01); *C22C 38/06* (2013.01); *C22C 38/20* (2013.01); *C22C 38/24* (2013.01); *C22C 38/26* (2013.01); *C22C 38/28* (2013.01); *C22C 38/30* (2013.01); *C22C 38/32* (2013.01); *C22C 38/44* (2013.01); *C22C 38/58* (2013.01); *C23C 2/022* (2022.08); *C23C 2/40* (2013.01); *C21D 2211/001* (2013.01); *C21D 2211/002* (2013.01); *C21D 2211/005* (2013.01); *C21D 2211/008* (2013.01)

(56) References Cited

FOREIGN PATENT DOCUMENTS

| | | |
|---|---|---|
| WO | WO 2016/010144 A1 | 1/2016 |
| WO | WO 2017/195795 A1 | 11/2017 |

* cited by examiner

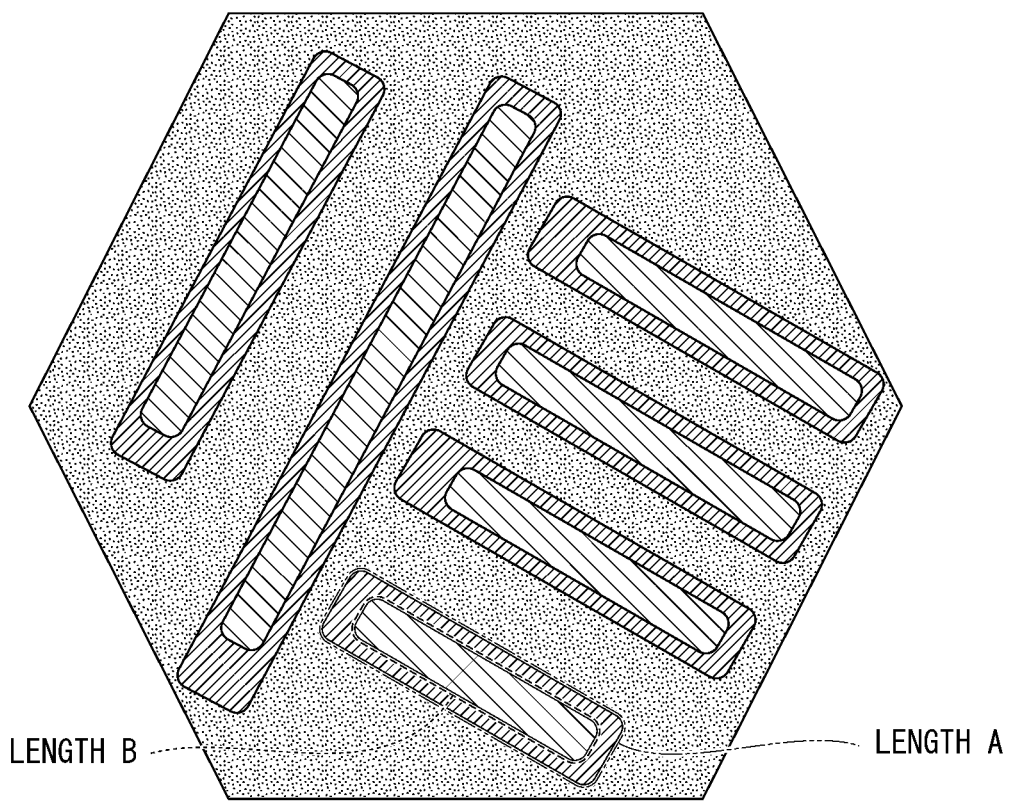

STEEL SHEET AND MANUFACTURING METHOD THEREOF

TECHNICAL FIELD

The present invention relates to a steel sheet and a manufacturing method thereof.

Priority is claimed on Japanese Patent Application No. 2020-003677, filed in Japan on Jan. 14, 2020, the content of which is incorporated herein by reference.

BACKGROUND ART

In recent years, there have been attempts to reduce the weights of vehicle bodies using high strength steel sheets from the viewpoint of improvement in gas mileage which leads to environmental protection. Generally, in the workings of steel sheets having an extremely high strength, it is difficult to apply forming methods that are applied to soft steel sheets such as drawing or stretch forming, and bending forming is a dominant forming method.

For example, Patent Document 1 below discloses a technique in which bending is performed on high strength steel sheets to form components.

CITATION LIST

Patent Document

Patent Document 1

PCT International Publication No. WO 2017/195795

SUMMARY OF THE INVENTION

Problems to be Solved by the Invention

However, in a case where bending is performed on a high strength steel sheet to form a component, since the strain rate on the outside of the bent steel sheet is fast, the sheet thickness decrease rate in that region is large, and there has been a case where it is difficult to obtain a preferable member rigidity.

Therefore, an objective of the present invention is to provide a steel sheet having a tensile strength of 980 MPa or more and having a preferable member rigidity even after bending and a manufacturing method thereof.

Means for Solving the Problem

The present inventors performed intensive studies regarding how to prevent a sheet thickness decrease on the outside of a bent steel sheet. As a result, the present inventors considered that, when a steel sheet is made to have a high yield point (YP) in a portion where the strain rate is fast, even in a steel sheet having a tensile strength of 980 MPa or more, a preferable member rigidity can be obtained in the outside region of a bent steel sheet.

The gist of the present invention obtained as described above is as described below.

[1] A steel sheet according to one aspect of the present invention contains, as a chemical composition, in mass %,
C: 0.050% or more and 0.500% or less,
Si: 0.01% or more and 2.50% or less,
Mn+Cr: 1.20% or more and 4.00% or less,
Al: 0.10% or more and 2.00% or less,
P: 0% or more and 0.100% or less,
S: 0% or more and 0.050% or less,
N: 0% or more and 0.010% or less,
O: 0% or more and 0.006% or less,
Mo: 0% or more and 1.000% or less,
Ti: 0% or more and 0.200% or less,
Nb: 0% or more and 0.200% or less,
B: 0% or more and 0.010% or less,
V: 0% or more and 0.200% or less,
Cu: 0% or more and 1.000% or less,
W: 0% or more and 0.100% or less,
Ta: 0% or more and 0.100% or less,
Ni: 0% or more and 1.000% or less,
Sn: 0% or more and 0.050% or less,
Co: 0% or more and 0.500% or less,
Sb: 0% or more and 0.050% or less,
As: 0% or more and 0.050% or less,
Mg: 0% or more and 0.050% or less,
Ca: 0% or more and 0.050% or less,
Y: 0% or more and 0.050% or less,
Zr: 0% or more and 0.050% or less,
La: 0% or more and 0.050% or less,
Ce: 0% or more and 0.050% or less, and
a remainder consisting of Fe and impurities,
in which a metallographic structure at a position of ¼ of a sheet thickness from a surface includes, in volume percentage,
ferrite and epitaxial ferrite: 10% or more and less than 50%,
a proportion of the epitaxial ferrite in a total volume percentage of the ferrite and the epitaxial ferrite: 5% or more and 30% or less,
martensite: 20% or more and 70% or less,
bainite: 50% or less,
residual austenite: 15% or less, and
a remainder in microstructure: 5% or less,
a total volume percentage of the bainite, the residual austenite and the remainder in microstructure is 50% or less,
A/B, which is a ratio of a length A of an interface between the epitaxial ferrite and the ferrite to a length B of an interface between the epitaxial ferrite and the martensite in a cross section that is along a rolling direction and perpendicular to the surface at the position of ¼ of the sheet thickness from the surface, is more than 1.5,
a ratio of a major axis to a minor axis of the martensite is 5.0 or more, and
a tensile strength is 980 MPa or more.

[2] The steel sheet according to [1] may further contain, as the chemical composition, in mass %, one or more selected from the group consisting of:
Mo: 0.010% to 1.000%,
B: 0.0001% to 0.010%,
Ti: 0.010% to 0.200%,
Nb: 0.010% to 0.200%,
V: 0.010% to 0.200%,
Cu: 0.001% to 1.000%, and
Ni: 0.001% to 1.000%.

[3] In the steel sheet according to [1] or [2], a hot-dip galvanized layer may be provided on the surface of the steel sheet.

[4] In the steel sheet according to [1] or [2], a hot-dip galvannealed layer may be provided on the surface of the steel sheet.

[5] In the steel sheet according to [1] or [2], an electrogalvanized layer may be provided on the surface of the steel sheet.

[6] A manufacturing method of a steel sheet according to another aspect of the present invention includes
a hot rolling step of hot-rolling a slab having a chemical composition containing, in mass %,
C: 0.050% or more and 0.500% or less,
Si: 0.01% or more and 2.50% or less,
Mn+Cr: 1.20% or more and 4.00% or less,
Al: 0.10% or more and 2.00% or less,
P: 0% or more and 0.100% or less,
S: 0% or more and 0.050% or less,
N: 0% or more and 0.010% or less,
O: 0% or more and 0.006% or less,
Mo: 0% or more and 1.000% or less,
Ti: 0% or more and 0.200% or less,
Nb: 0% or more and 0.200% or less,
B: 0% or more and 0.010% or less,
V: 0% or more and 0.200% or less,
Cu: 0% or more and 1.000% or less,
W: 0% or more and 0.100% or less,
Ta: 0% or more and 0.100% or less,
Ni: 0% or more and 1.000% or less,
Sn: 0% or more and 0.050% or less,
Co: 0% or more and 0.500% or less,
Sb: 0% or more and 0.050% or less,
As: 0% or more and 0.050% or less,
Mg: 0% or more and 0.050% or less,
Ca: 0% or more and 0.050% or less,
Y: 0% or more and 0.050% or less,
Zr: 0% or more and 0.050% or less,
La: 0% or more and 0.050% or less,
Ce: 0% or more and 0.050% or less, and
a remainder consisting of Fe and impurities, to produce a hot-rolled steel sheet in which a prior austenite grain size is smaller than 30 μm;
a cooling step of cooling the hot-rolled steel sheet to 500° C. or lower at an average cooling rate of 20° C./second or faster;
a coiling step of coiling the hot-rolled steel sheet after the cooling step at 500° C. or lower;
a cold rolling step of pickling the hot-rolled steel sheet after the coiling step and cold-rolling the hot-rolled steel sheet at a rolling reduction of 30% or smaller to produce a cold-rolled steel sheet;
an annealing step of heating the cold-rolled steel sheet to a first temperature range of (Ac3 point—100°) C to 900° C. and soaking the cold-rolled steel sheet in the first temperature range for five seconds or longer; and
an annealing cooling step of cooling the cold-rolled steel sheet after the annealing step at an average cooling rate of 2.5° C./second to 50° C./second in a second temperature range of 750° C. to 550° C.

[7] In the manufacturing method of a steel sheet according to [6], the hot rolling step may include a finish rolling step of rolling the slab by continuously passing the slab through a plurality of rolling stands,
in the finish rolling step,
a rolling start temperature at a third rolling stand from a last rolling stand may be 800° C. to 1000° C.,
in each of the last three rolling stands in the finish rolling step, the slab may be rolled at a rolling reduction of larger than 10%,
an interpass time between the individual rolling stands in the last three rolling stands in the finish rolling step may be 3.0 seconds or shorter, and
$(T_n - T_{n+1})$, which is a difference between an exiting-side temperature $T_n$ of the n-th rolling stand of the last three rolling stands and an entering-side temperature $T_{n+1}$ of the (n+1)-th rolling stand of the last three rolling stands in the finish rolling step, may be larger than 10° C.

[8] In the manufacturing method of a steel sheet according to [6] or [7], a hot-dip galvanizing layer may be formed by immersing the cold-rolled steel sheet after the annealing cooling step in a hot-dip galvanizing bath.

[9] In the manufacturing method of a steel sheet according to [8], the hot-dip galvanizing layer may be alloyed in a temperature range of 300° C. to 600° C.

Effects of the Invention

According to the present invention, it is possible to provide a steel sheet having a tensile strength of 980 MPa or more and having a preferable member rigidity even after bending and a manufacturing method thereof.

BRIEF DESCRIPTION OF DRAWINGS

FIG. 1 is a schematic view showing an example of a length A of an interface between epitaxial ferrite and ferrite and a length B of an interface between the epitaxial ferrite and martensite.

EMBODIMENTS FOR IMPLEMENTING THE INVENTION

Hereinafter, an embodiment of the present invention will be described. The embodiment to be exemplified below is intended to facilitate the understanding of the present invention and is not intended to interpret the present invention in a limited manner. The present invention can be modified and improved from the following embodiment within the scope of the gist of the present invention.

[Steel Sheet]

A steel sheet according to the present embodiment contains, as the chemical composition, in mass %,
C: 0.050% or more and 0.500% or less,
Si: 0.01% or more and 2.50% or less,
Mn+Cr: 1.20% or more and 4.00% or less,
Al: 0.10% or more and 2.00% or less,
P: 0% or more and 0.100% or less,
S: 0% or more and 0.050% or less,
N: 0% or more and 0.010% or less,
O: 0% or more and 0.006% or less,
Mo: 0% or more and 1.000% or less,
Ti: 0% or more and 0.200% or less,
Nb: 0% or more and 0.200% or less,
B: 0% or more and 0.010% or less,
V: 0% or more and 0.200% or less,
Cu: 0% or more and 1.000% or less,
W: 0% or more and 0.100% or less,
Ta: 0% or more and 0.100% or less,
Ni: 0% or more and 1.000% or less,
Sn: 0% or more and 0.050% or less,
Co: 0% or more and 0.500% or less,
Sb: 0% or more and 0.050% or less,
As: 0% or more and 0.050% or less,
Mg: 0% or more and 0.050% or less,
Ca: 0% or more and 0.050% or less,
Y: 0% or more and 0.050% or less,
Zr: 0% or more and 0.050% or less,
La: 0% or more and 0.050% or less,
Ce: 0% or more and 0.050% or less, and
a remainder consisting of Fe and impurities,
a metallographic structure in a sheet thickness ¼ portion includes, by volume percentage, ferrite and epitaxial ferrite: 10% or more and less than 50%,
a proportion of the epitaxial ferrite in the sum of the structural proportions of the ferrite and the epitaxial ferrite: 5% or more and 30% or less,
martensite: 20% or more and 70% or less,
bainite: 50% or less,
residual austenite: 15% or less, and
a remainder in microstructure: 5% or less,
a total volume percentage of the bainite, the residual austenite and the remainder in microstructure is 50% or less,
a ratio of a length A of an interface between the epitaxial ferrite and the ferrite to a length B of an interface between the epitaxial ferrite and the martensite at the sheet thickness ¼ portion, that is, A/B is more than 1.5,
a ratio of a major axis to a minor axis of the martensite is 5.0 or more, and
a tensile strength is 980 MPa or more.

Hereinafter, the steel sheet according to the present embodiment will be described.

<Chemical Composition>

Subsequently, a desirable chemical composition of the steel sheet for obtaining the effect of the present invention will be described. The chemical composition of the steel sheet refers to the chemical compositions in the steel sheet central part and in the surface layer area, and the chemical composition in the surface layer area refers to the chemical composition in the matrix of the surface layer area excluding Al oxide particles. The chemical composition in the steel sheet central part and the chemical composition in the matrix of the surface layer area may be the same as each other or may be different from each other within the range of the chemical composition of the steel sheet to be described below. "%" relating to the amount of an element indicates "mass %" unless particularly otherwise described.

"C: 0.050% or More and 0.500% or Less"

C is an element that increases the strength of the steel sheet and is added to increase the strength of the steel sheet. When the C content is 0.050% or more, the strength of the steel sheet can be sufficiently increased. The C content is preferably 0.100% or more and more preferably 0.150% or more. In addition, when the C content is larger than 0.500%, since martensite becomes extremely hard, the steel sheet is likely to crack even in an elastic deformation region, the steel sheet ruptures from initiated cracks as origins, and a target strength cannot be obtained. From such a viewpoint, the C content is 0.500% or less and preferably 0.400% or less.

"Si: 0.01% or More and 2.50% or Less"

Si is an element that stabilizes ferrite. That is, Si increases the Ac3 transformation point and is thus capable of forming a large amount of ferrite in a wide annealing temperature range and is added from the viewpoint of improving the microstructure control of the steel sheet. In order to obtain such an effect, in the steel sheet according to the present embodiment, the Si content is set to 0.01% or more. Additionally, Si is an element necessary to suppress the coarsening of an iron-based carbide in the steel sheet central part and to enhance the strength and formability of the steel sheet. In addition, Si is added to contribute to high-strengthening of the steel sheet as a solid solution strengthening element. From these viewpoints, the lower limit of the Si content is preferably 0.10% or more and more preferably 0.30% or more. When the Si content becomes large, since the steel sheet becomes brittle and the formability of the steel sheet deteriorates, the Si content is set to 2.50% or less and is preferably 1.80% or less.

"Mn+Cr: 1.20% or More and 4.00% or Less"

Mn and Cr are elements added to enhance the hardenability of the steel sheet and to increase the strength. In order to obtain such an effect, in the steel sheet according to the present embodiment, the Mn+Cr content is set to 1.20% or more. When the amounts of Mn and Cr are too large, since the hardenability is excessively enhanced and epitaxial ferrite cannot be sufficiently obtained, the Mn+Cr content is set to 4.00% or less and is preferably 3.50% or less. In addition, in order to ensure sufficient hardenability, the Mn content is preferably set to 1.20% or more. Cr may not be contained, and the lower limit thereof is set to 0%.

"Al: 0.10% or More and 2.00% or Less"

Al is an element that accelerates the formation of epitaxial ferrite. Therefore, the Al content is 0.10% or more. The Al content is preferably 0.30% or more and more preferably 0.40% or more. On the other hand, when the Al content is set to 2.00% or less, it is possible to suppress slab cracking during continuous casting.

"P: 0% or More and 0.100% or Less"

P tends to be segregated in the center portion of the steel sheet and has a risk of embrittling a welded part. When the P content is set to 0.100% or less, the embrittlement of the welded part can be suppressed. Since P is preferably not contained, the lower limit of the P content is 0%. However, from an economic viewpoint, the lower limit of the P content may be set to 0.001%.

"S: 0% or More and 0.050% or Less"

S is an element having a risk of adversely affecting the weldability of the steel sheet and the manufacturability during casting and during hot rolling. Therefore, the S content is set to 0.050% or less. Since S is preferably not contained, the lower limit of the S content is 0%. However, from an economic viewpoint, the lower limit of the S content may be set to 0.001%.

"N: 0% or More and 0.010% or Less"

Since N has a risk of forming a coarse nitride and degrading the bendability of the steel sheet, it is necessary to suppress the amount of N added. When the N content is set to 0.010% or less, the degradation of the bendability of the steel sheet can be suppressed. Additionally, since there is a case where N causes the generation of a blowhole during welding, the N content is preferably as small as possible and is ideally 0%. However, from an economic viewpoint, the lower limit of the N content may be set to 0.0005%.

"O: 0% or More and 0.006% or Less"

O is an element that forms a coarse oxide, impairs the bendability or the hole expansibility, and causes the generation of a blowhole during welding. When the O content exceeds 0.006%, the degradation of the hole expansibility or the generation of a blowhole becomes significant. Therefore, the O content is set to 0.006% or less. Since O is preferably not contained, the lower limit of the O content is 0%.

The remainder of the chemical composition of the steel sheet is Fe and impurities. Here, the following amounts of elements may be contained instead of some of Fe. However, since these elements may not be contained, the lower limits are set to zero.

Mo: 0% or more and 1.000% or less,
Ti: 0% or more and 0.200% or less,
Nb: 0% or more and 0.200% or less,
B: 0% or more and 0.010% or less,
V: 0% or more and 0.200% or less,
Cu: 0% or more and 1.000% or less,
W: 0% or more and 0.100% or less, Ta: 0% or more and 0.100% or less,
Ni: 0% or more and 1.000% or less,
Sn: 0% or more and 0.050% or less,
Co: 0% or more and 0.500% or less,
Sb: 0% or more and 0.050% or less,
As: 0% or more and 0.050% or less,
Mg: 0% or more and 0.050% or less,
Ca: 0% or more and 0.050% or less,
Y: 0% or more and 0.050% or less,
Zr: 0% or more and 0.050% or less,
La: 0% or more and 0.050% or less, and
Ce: 0% or more and 0.050% or less.

"Mo: 0% or more and 1.000% or less and B: 0% or more and 0.010% or less"

Mo and B are elements that enhance the hardenability and contribute to improvement in the strength of the steel sheet. The effects of these elements can be obtained even when the elements are added in a small amount; however, in order to sufficiently obtain the effects, it is preferable to set the Mo content to 0.010% or more and to set the B content to 0.0001% or more. On the other hand, from the viewpoint of suppressing the deterioration of the pickling property, weldability, hot workability and the like of the steel sheet, it is preferable to set the upper limit of the Mo content to 1.000% or less and to set the upper limit of the B content to 0.010% or less.

"Ti: 0% or More and 0.200% or Less, Nb: 0% or More and 0.200% or Less, and V: 0% or More and 0.200% or Less"

Ti, Nb and V are each an element that contributes to improvement in the strength of the steel sheet. These elements contribute to an increase in the strength of the steel sheet by means of precipitate strengthening, grain refinement strengthening by the suppression of the growth of ferrite crystal grains, and dislocation strengthening through the suppression of recrystallization. The effect of these elements can be obtained even when the elements are added in a small amount; however, in order to sufficiently obtain the effect, it is preferable to add 0.010% or more of Ti, 0.010% or more of Nb, or 0.010% or more of V. However, from the viewpoint of suppressing the deterioration of the formability of the steel sheet caused by the precipitation of a number of carbonitride molecules, the Ti content is preferably 0.200% or less, the Nb content is preferably 0.200% or less, or the V content is preferably 0.200% or less.

"Cu: 0% or More and 1.000% or Less and Ni: 0% or More and 1.000% or Less"

Cu and Ni are each an element that contributes to improvement in the strength of the steel sheet. The effect of these elements can be obtained even when the elements are added in a small amount; however, in order to sufficiently obtain the effect, the Cu content and the Ni content are each preferably 0.001% or more. On the other hand, from the viewpoint of suppressing the deterioration of the pickling property, weldability, hot workability and the like of the steel sheet, the Cu content and the Ni content are each preferably 1.000% or less.

Furthermore, the following elements may be added intentionally or inevitably to the steel sheet central part and the surface layer area instead of some of Fe as long as the effect of the present invention can be obtained. That is, rare-earth metals (REM) such as W: 0% or more and 0.100% or less, Ta: 0% or more and 0.100% or less, Sn: 0% or more and 0.050% or less, Co: 0% or more and 0.500% or less, Sb: 0% or more and 0.050% or less, As: 0% or more and 0.050% or less, Mg: 0% or more and 0.050% or less, Ca: 0% or more and 0.050% or less, Y: 0% or more and 0.050% or less, Zr: 0% or more and 0.050% or less, La: 0% or more and 0.050% or less, and Ce: 0% or more and 0.050% or less may be added.

<Metallographic Structure>

Next, the metallographic structure of the steel sheet according to the present embodiment will be described. The proportions of metallographic structures will be expressed by volume percentages. In the case of measuring area ratios by image processing, the area ratios will be regarded as volume percentages. In the following description of the order of measuring the volume percentages, "volume percentage" and "area ratio" are used in a mixed manner in some cases.

In the steel sheet according to the present embodiment, the metallographic structure at a position of ¼ of a sheet thickness from the surface of the steel sheet includes, by volume percentages, ferrite and epitaxial ferrite: 10% or more and less than 50%,
the proportion of the epitaxial ferrite in the total volume percentage of the ferrite and the epitaxial ferrite: 5% or more and 30% or less,
martensite: 20% or more and 70% or less,
bainite: 50% or less,
residual austenite: 15% or less, and
the remainder in microstructure: 5% or less.

Here, the total volume percentage of the bainite, the residual austenite and the remainder in microstructure is 50% or less.

(Ferrite)

Ferrite is a soft phase that is obtained by intercritical annealing in which steel is heated and held at a temperature of Ac1 point or higher and lower than Ac3 point or by slow cooling after annealing. In the steel sheet according to the present embodiment, ferrite and epitaxial ferrite are included at least in the metallographic structure at the position of ¼ of the sheet thickness from the surface of the steel sheet.

As long as ferrite is included in the metallographic structure at the position of ¼ of the sheet thickness from the surface of the steel sheet, the lower limit of the volume percentage is not particularly limited. However, in order to preferably improve the ductility of the steel sheet, 10% or more of ferrite is preferably included.

In addition, the upper limit of the volume percentage of the ferrite is also not particularly limited, but the volume percentage of the ferrite is preferably less than 50% since there is a need to limit the volume percentage of the ferrite in order to realize a strength of 980 MPa or more.

(Epitaxial ferrite: Total volume percentage with ferrite being 10% or more and less than 50% and proportion of epitaxial ferrite in total volume percentage with ferrite being 5% or more and 30% or less)

Epitaxial ferrite is obtained by the growth of ferrite obtained in intercritical annealing during the subsequent slow cooling. The present inventors realized that, in a steel sheet containing a large amount of Al, which is a ferrite-stabilizing element, when the growth rate of ferrite during the slow cooling is sufficiently fast, desired epitaxial ferrite can be obtained. In the structure according to the present embodiment, ferrite that grows toward the austenite side from the interface between ferrite and austenite in the slow cooling after the intercritical annealing will be referred to as epitaxial ferrite. That is, epitaxial ferrite is formed between martensite and ferrite. The dislocation density of epitaxial ferrite is lower than that of martensite and becomes higher than that of ferrite. Therefore, epitaxial ferrite deforms more easily than martensite, but has a higher yield point (YP) than ferrite. As described above, when a structure having an intermediate yield point compared with a hard structure such as martensite and a soft structure such as ferrite is disposed between both structures, it is possible to increase the yield point in a region with a fast strain rate. However, as described below, the dislocation density of epitaxial ferrite to be formed becomes low as long as the thickness of the epitaxial ferrite is not appropriate. Dislocations in epitaxial ferrite are introduced to relax plastic deformation caused by martensitic transformation; however, in a case where the thickness of the epitaxial ferrite is not appropriate, dislocations move beyond the epitaxial ferrite into ferrite, and thus the dislocation density in the epitaxial ferrite decreases. When the dislocation density of epitaxial ferrite is low, the yield point is not sufficient, and the above-described effect cannot be obtained. As in the present embodiment, when a hard structure inside the steel sheet coiled after hot rolling is made into a needle-like structure to also make austenite that is formed by subsequent annealing into a needle-like structure, it is also possible to make martensite that is formed by cooling after annealing into a needle-like structure. As a result, the width (thickness) of epitaxial ferrite that is present around martensite can be controlled to be within an appropriate range. Therefore, the dislocation density in epitaxial ferrite is preferably controlled without becoming low, and it is possible to increase the yield point in a region where the strain rate at the time of working the steel sheet is fast. A method for identifying epitaxial ferrite and ferrite will be described below, but a difference in the dislocation density makes the degree of corrosion progressed during etching different, which makes it possible to clearly distinguish epitaxial ferrite and ferrite with a structural photograph.

The sum of the volume percentages of the ferrite and the epitaxial ferrite at the position of ¼ of the sheet thickness from the surface of the steel sheet is 10% or more and less than 50%. In addition, the proportion of the epitaxial ferrite in the total volume percentage of the ferrite and the epitaxial ferrite is 5% or more and 30% or less. As described above, a high yield point can be exhibited even in a region where the strain rate is fast by suppressing the volume percentage of the epitaxial ferrite.

(Martensite: 20% or More and 70% or Less)

Martensite is a hard structure having a high dislocation density and is thus a structure that contributes to improvement in the tensile strength. The volume percentage of the martensite is set to 20% or more and 70% or less in consideration of the balance between strength and workability. The martensite in the present embodiment includes fresh martensite and tempered martensite. From the viewpoint of setting the tensile strength to 980 MPa or more, the volume percentage of the martensite is preferably 30% or more. In addition, the volume percentage of the martensite is preferably 55% or less from the viewpoint of ensuring preferable bendability.

(Bainite: 50% or Less)

Bainite is a hard structure having a high dislocation density, but has a low dislocation density and is soft compared with martensite and thus has an effect on improvement in the ductility. Therefore, up to 50% of bainite may be contained in order to obtain desired characteristics. Incidentally, bainite is not an essential metallographic structure for obtaining the effect of the present embodiment, and thus the proportion of bainite may be 0%.

(Residual Austenite: 15% or Less)

Residual austenite improves the ductility by a TRIP effect and contributes to improvement in uniform elongation. Therefore, up to 15% of residual austenite may be contained.

Incidentally, residual austenite is not an essential metallographic structure for obtaining the effect of the present embodiment, and thus the proportion of residual austenite may be 0%.

(Remainder in Microstructure: 5% or Less)

As the remainder in microstructure, pearlite and the like are exemplified. These structures degrade the workability, and thus the proportion thereof is set to 5% or less.

The total volume percentage of the bainite, the residual austenite, and the remainder in microstructure is set to 50% or less. When the volume percentage is set to 50% or less, it is possible to ensure the effect in the present embodiment.

Next, a method for discriminating ferrite, epitaxial ferrite and martensite and a method for calculating structural proportions will be described. Structures other than the above-described structures are regarded as the remainder in microstructure. In the calculation of structural proportions, area ratios obtained from a structural photograph are regarded as volume percentages.

The identification of each metallographic structure and the calculation of the volume percentage are performed by electron back scattering diffraction (EBSD), X-ray measurement, corrosion using a Nital reagent or a LePera solution and a scanning electron microscope. An observation region is located at the center of the sheet width and is a 100 µm×100 µm region in a cross section along a rolling direction of the steel sheet and perpendicular to the sheet surface. The observation is performed at a magnification of 3000 times. There is a case where the microstructures (configuration elements) in the vicinity of the steel sheet surface and in the vicinity of the steel sheet center are each significantly different from the microstructures of other portions in a sheet thickness direction. Therefore, in the present embodiment, the microstructure is observed at the ¼ sheet thickness position as a base.

The outline of the measurement order is as described below.

First, the X-ray diffraction intensity of a polished sample is measured, and the volume percentage of residual austenite is obtained. Subsequently, the sample is etched using a Nital reagent, a secondary electron image obtained with an FE-SEM is observed, the metallographic structure is distinguished into three categories of (i) pearlite, (ii) epitaxial ferrite and ferrite and (iii) martensite, bainite and residual austenite, and the area ratio of the pearlite is obtained. (ii) The epitaxial ferrite and the ferrite are distinguished by the luminosity in an image for which the observation conditions are controlled, and the area ratios thereof are obtained, respectively.

After that, the sample is etched using a LePera reagent, and a secondary electron image obtained with the FE-SEM is observed. In this observation, bainite is distinguished from martensite and residual austenite, and the area ratio of the bainite is obtained. Finally, the volume percentage of the residual austenite measured using X-rays is subtracted from the area ratios of the martensite and the residual austenite, thereby obtaining the area ratio of the martensite.

Hereinafter, a specific order will be described.

The volume percentage of the residual austenite can be calculated by measuring diffraction intensities using X-rays.

In the measurement using X-rays, a portion from the sheet surface of the sample to a depth ¼ position is removed by mechanical polishing and chemical polishing. The microstructural fraction of the residual austenite can be calculated from the integrated intensity ratio of the diffraction peaks of (200) and (211) of a bcc phase and (200), (220), and (311)

of an fcc phase using MoKα rays at the sheet thickness ¼ position. As a general calculation method, a five-peak method is used.

Pearlite is identified in the following order. An observed section of the sample is corroded with a Nital reagent, and a 100 μm×100 μm region in a sheet thickness ⅛ to ⅜ range in which the sheet thickness ¼ is centered is observed using the FE-SEM at a magnification of 3000 times. From the position of cementite that is included in the structure and the arrangement of cementite, a region where ferrite and cementite are arranged in a lamellar shape is discriminated as pearlite. The area ratio is obtained by performing image analysis using image analysis software ImageJ.

Ferrite and epitaxial ferrite are identified in the following order. An observed section of the sample is corroded with, particularly, a liquid mixture of 3% nitric acid and ethanol as a Nital reagent, and a 100 μm×100 μm region in the sheet thickness ⅛ to ⅜ range in which the sheet thickness ¼ is centered is observed using the FE-SEM at a magnification of 3000 times. Portions with uniform contrast (portions that do not include substructures such as blocks and packets, cementite, or residual austenite in the crystal grains and appear in a single uniform contrast) are ferrite and epitaxial ferrite. The area ratios calculated by image analysis using the image analysis software ImageJ are regarded as the area ratios of ferrite and epitaxial ferrite.

In order to distinguish ferrite and epitaxial ferrite, the observation conditions are set to an accelerating voltage of 15 kV and a WD of 10 mm. In an observation image image-analyzed using the image analysis software ImageJ, a structure with a brightness having peaks at 85% or more of the total is martensite, a structure having peaks at 60% or more and less than 85% is ferrite, and a structure having peaks at 45% or more and less than 60% is epitaxial ferrite. Therefore, it is possible to distinguish ferrite and epitaxial ferrite and to calculate the proportion of epitaxial ferrite in the ferrite and epitaxial ferrite.

Bainite is identified in the following order. An observed section of the sample is etched with a LePera solution, and a 100 μm×100 μm region in the sheet thickness ⅛ to ⅜ range in which the sheet thickness ¼ is centered is observed using the FE-SEM at a magnification of 3000 times. From the position of cementite that is included in the structure and the arrangement of cementite, bainite can be discriminated. Specifically, cementite having a plurality of variants is discriminated as bainite, and the area ratio is obtained using the image analysis software ImageJ.

Martensite is identified in the following order. An observed section of the sample is etched with a LePera solution, and a 100 μm×100 μm region in the sheet thickness ⅛ to ⅜ range in which the sheet thickness ¼ is centered is observed using the FE-SEM at a magnification of 3000 times. Since it is difficult to corrode martensite and residual austenite via LePera corrosion, the area ratio of these structures is the total area ratio of martensite and residual austenite. The area ratio of martensite can be calculated by obtaining the area ratios of these uncorroded regions using the image analysis software ImageJ and subtracting the volume percentage of residual austenite measured by X-rays.

<Ratio of Major Axis to Minor Axis of Martensite being 5.0 or More>

In the steel sheet according to the present embodiment, the ratio of the major axis to the minor axis of the martensite is 5.0 or more. This indicates that the martensite has a large aspect ratio and has a so-called needle-like structure. It means that, in a case where the ratio is less than 5.0, the needle-like structure of the martensite in the present embodiment has collapsed. When the ratio is set to 5.0 or more, the width (thickness) of the epitaxial ferrite that is formed between the ferrite and the martensite becomes thin, and it is possible to increase the dislocation density in the epitaxial ferrite. Therefore, it is possible to form epitaxial ferrite having a preferable yield point between the ferrite and the martensite and to obtain a high yield point even in a region where the strain rate at the time of working the steel sheet is fast. The ratio is preferably 6.0 or more and more preferably 7.0 or more.

Next, a method for measuring the ratio of the major axis to the minor axis of the martensite will be described.

First, the area of each martensite grain specified by the above-described image processing is measured. Next, the major axis in each martensite grain is measured. Here, the major axis refers to the maximum length of line segments that connect two points on the periphery of the martensite grain. Subsequently, for each martensite grain, a value obtained by dividing the area by the major axis is calculated as the minor axis. Finally, for each martensite grain, the ratio of the major axis to the minor axis is calculated, and the average value thereof is obtained.

<A/B, ratio of length A of interface between epitaxial ferrite and ferrite to length B of interface between epitaxial ferrite and martensite in cross section in direction perpendicular to rolling direction: more than 1.5>

In the steel sheet according to the present embodiment, A/B that is the ratio of the length A of the interface between the epitaxial ferrite and the ferrite to the length B of the interface between the epitaxial ferrite and the martensite in a cross section that is along a rolling direction and perpendicular to the surface of the steel sheet is more than 1.5. When the ratio is more than 1.5, a sufficient amount of the epitaxial ferrite is present in the interface between the martensite and the ferrite, and the yield point in a region with a fast strain rate is preferably increased by bending or the like. As a result, a decrease in the sheet thickness at the portion can be suppressed, and thus a preferable member rigidity can be obtained.

A/B is preferably 1.7 or more and more preferably 1.8 or more.

The upper limit of A/B is not particularly limited and may be set to 3.0 in consideration of the proportion of the epitaxial ferrite and the ratio between the major axis and the minor axis of the martensite.

Next, a method for measuring the A/B will be described.

FIG. 1 is a schematic view showing an example of the length A of an interface between the epitaxial ferrite and the ferrite and the length B of an interface between the epitaxial ferrite and martensite. The region of each structure can be identified with image processing software. The ratio of the length A of the interface between the epitaxial ferrite and the ferrite and the length B of the interface between the epitaxial ferrite and the martensite in an entire visual field that is obtained with image processing software becomes A/B.

<Tensile Strength: 980 MPa or More>

The tensile strength (TS) of the steel sheet according to the present embodiment is 980 MPa or more.

The tensile strength is measured by collecting a JIS No. 5 tensile test piece described in JiS Z 2201 from the annealed steel sheet in a direction perpendicular to the rolling direction and performing a tensile test in accordance with JIS Z 2241: 2011.

<Difference in 0.2% Proof Stress (YP) Between Strain Rates of 0.001/Second and 0.01/Second being 7 MPa or More>

In the steel sheet according to the present embodiment, as a superior characteristic that contributes to suppressing a decrease in the sheet thickness in a region with a fast strain rate when the steel sheet has been deformed, the difference in 0.2% proof stress (YP) between strain rates of 0.001/second and 0.01/second more preferably becomes 7 MPa or more.

The difference in YP can be obtained by collecting a JIS No. 5 tensile test piece described in JIS Z 2201 from the annealed steel sheet in a direction perpendicular to the rolling direction, obtaining YPs at strain rates of 0.001/second and 0.01/second, and calculating the difference therebetween.

The steel sheet of the present embodiment may have a hot-dip galvanized layer, a hot-dip galvannealed layer, or an electrogalvanized layer on the surface. Even in a case where a plating layer is formed as described above, the steel sheet of the present embodiment exhibits desired characteristics.

[Manufacturing Method of Steel Sheet]

Next, an example of a manufacturing method for obtaining the steel sheet of the present embodiment will be described.

A manufacturing method of a steel sheet according to the present embodiment has a hot rolling step of hot-rolling a slab having the above-described chemical composition to produce a hot-rolled steel sheet in which prior austenite grain sizes are smaller than 30 μm, a cooling step of cooling the hot-rolled steel sheet to 500° C. or lower at an average cooling rate of 20° C./second or faster, a coiling step of coiling the hot-rolled steel sheet after the cooling step at 500° C. or lower, a cold rolling step of pickling the hot-rolled steel sheet after the coiling step and cold-rolling the hot-rolled steel sheet at a rolling reduction of 30% or smaller to produce a cold-rolled steel sheet, an annealing step of heating a thickness middle portion of the cold-rolled steel sheet to a first temperature range of (Ac3 point—100°) C to 900° C. and soaking the cold-rolled steel sheet in the first temperature range for five seconds or longer, and an annealing cooling step of cooling the cold-rolled steel sheet after the annealing step at an average cooling rate of 2.5° C./second to 50° C./second in a second temperature range of 750° C. to 550° C.

(Hot Rolling Step)

In the hot rolling step, a slab having the above-described chemical components is hot-rolled to produce a hot-rolled steel sheet. The hot rolling is performed such that the average value of prior austenite grain sizes obtained by a line segment method in which an optical microscopic photograph of the hot-rolled steel sheet is used reaches smaller than 30 μm. This hot rolling step includes a rough rolling step and a finish rolling step of rolling the slab by continuously passing the slab through a plurality of rolling stands.

When the prior austenite grain sizes in the hot-rolled steel sheet are set to smaller than 30 μm, it is possible to suppress austenite grains transformed in the subsequent annealing step being coupled together to form massive austenite. When the coupling into massive austenite is suppressed, it is possible to increase the aspect ratio of the martensite (the ratio of the major axis to the minor axis is 5.0 or more).

The prior austenite grain sizes in the hot-rolled steel sheet are measured by the line segment method in which, in a cross section along the rolling direction of the steel sheet and perpendicular to the sheet surface, an observed section is Nital-corroded and the structure is observed with an optical microscope at a magnification of 100 to 500 times. Hereinafter, an example of hot rolling conditions preferable for setting the prior austenite grain sizes in the hot-rolled steel sheet to smaller than 30 μm will be described. The prior austenite grain sizes are measured at the sheet thickness ¼ position of the hot-rolled steel sheet.

Rolling Start Temperature at Third Rolling Stand from Last Rolling Stand: 800° C. to 1000° C.

In the manufacturing method of a steel sheet according to the present embodiment, the rolling start temperature at a third rolling stand from the last rolling stand (hereinafter, referred to as the finish rolling stand in some cases) (hereinafter, simply referred to as the rolling start temperature in some cases) is set to 800° C. to 1000° C. When the rolling start temperature is set to 800° C. or higher, an increase in the rolling reaction force is suppressed, and it becomes easy to stably obtain a desired sheet thickness, which is preferable. On the other hand, when the rolling start temperature is set to 1000° C. or lower, it is possible to suppress the coarsening of prior austenite grains, which is preferable. The finish rolling completion temperature is set to 800° C. or higher from the viewpoint of ensuring a hard structure.

Here, the rolling stand third from the finish rolling stand refers to, for example, the fifth rolling stand in a case where continuous rolling is performed with seven rolling stands.

Rolling Reduction in Each of Last Three Rolling Stands in Finish Rolling: Larger than 10%

In the finish rolling step, the slab is continuously passed through a plurality of rolling stands to perform rolling. At this time, the rolling is preferably performed with the rolling reduction in each of the last three rolling stands set to larger than 10%. Here, rolling in the last three rolling stands means rolling using the last three rolling stands. For example, in a case where continuous rolling is performed with seven rolling stands, the rolling in the last three rolling stands means rolling in the fifth to seventh rolling stands. When the rolling reduction in each of the last three rolling stands is set to larger than 10%, sufficient rolling strain can be introduced, and thus it is possible to sufficiently refine austenite grains. The rolling reductions in the last three rolling stands in the finish rolling are more preferably set to 20% or larger. The upper limit of the rolling reduction in each of the last three rolling stands in the finish rolling is not particularly limited and may be set to 40% or smaller from the viewpoint of manufacturability.

Interpass Time Between Individual Rolling Stands in Last Three Rolling Stands in Finish Rolling: 3.0 Seconds or Shorter The interpass time between the individual rolling stands in the last three rolling stands in the finish rolling is preferably 3.0 seconds or shorter. In such a case, recovery and recrystallization between passes are suppressed, and it becomes easy to sufficiently accumulate strain. The interpass time between the individual rolling stands is more preferably set to 2.0 seconds or shorter. The lower limit of the interpass time between the individual rolling stands is not particularly limited, but is preferably as short as possible and is ideally zero, but may be set to 0.1 seconds or longer in consideration of the performance of the rolling stands.

$(T_n-T_{n+1})$, difference between exiting-side temperature $T_n$ of n-th rolling stand of last three rolling stands and entering-side temperature $T_{n+1}$ of (n+1)-th rolling stand of last three rolling stands in finish rolling: Larger than 10° C.

Strain can be preferably accumulated by controlling $(T_n-T_{n+1})$ that is the difference between the exiting-side temperature $T_n$ of the n-th rolling stand of the last three rolling stands and the entering-side temperature $T_{n+1}$ of the (n+1)-th rolling stand of the last three rolling stands in the finish rolling. When $(T_n-T_{n+1})$ is set to larger than 10° C., recovery and recrystallization between the passes are suppressed, and it is possible to sufficiently accumulate strain in the finish rolling step, which is preferable. For the n-th rolling stand, n increases along a conveyance direction of the slab (or the steel sheet). That is, the slab (or the steel sheet) passes through the n-th rolling stand, then, sequentially passes through the (n+1)-th rolling stand and the (n+2)-th rolling stand.

(Cooling Step)

After the hot rolling step, the steel sheet hot-rolled as described above (hereinafter, referred to as the hot-rolled steel sheet in some cases) is cooled to a cooling stop temperature of 500° C. or lower at a cooling rate of 20° C./second or faster. This cooling step is a step necessary to make the majority of the steel sheet into a hard structure (low-temperature transformed structure) and to make the structure during annealing and after cooling into a needle-like structure. When the average cooling rate is set to 20° C./second or faster, ferritic transformation or pearlitic transformation is suppressed, and a hard structure that serves as the origin of a future needle-like structure can be obtained. The average cooling rate is preferably 30° C./second or faster and more preferably 40° C./second or faster. The upper limit is not particularly limited, but may be set to 100° C./second or slower from the viewpoint of manufacturability. However, at a temperature lower than 500° C., the steel sheet is transformed into a low-temperature transformed structure, and thus the average cooling rate is not limited.

(Coiling Step)

Next, the hot-rolled steel sheet cooled in the cooling step is coiled. In this coiling step, the coiling temperature is preferably 500° C. or lower. Since the hot-rolled steel sheet of the present embodiment coiled as described above has a needle-like structure, when the hot-rolled steel sheet undergoes subsequent cold rolling and a continuous annealing step, it becomes possible to obtain a needle-like martensite structure having a predetermined aspect ratio.

(Cold Rolling Step)

Next, the hot-rolled steel sheet after the coiling step is pickled and cold-rolled at a rolling reduction of 30% or smaller to produce a cold-rolled steel sheet. A cold rolling reduction of 0% means that cold rolling is not performed.

The pickling is a step for removing an oxide on the surface of the hot-rolled steel sheet, and the number of times of pickling may be once or a plurality of times.

When the rolling reduction of the cold rolling is set to 30% or less, since the needle-like structure introduced in the hot rolling step is maintained, a desired metallographic structure can be obtained.

(Annealing Step)

After the above-described steps, an annealing step is performed to obtain a desired metallographic structure. In the annealing step, the steel sheet is heated to a temperature range of (Ac3 point—100° C.) or higher and 900° C. or lower (hereinafter, referred to as the first temperature range in some cases), and then the temperature is held (soaked) in the first temperature range for five seconds or longer. While the temperature is held in the first temperature range, the temperature of the steel sheet does not need to be constant.

The reason for heating the steel sheet to (Ac3 point—100° C.) or higher and 900° C. or lower is to obtain a desired proportion of a metallographic structure by heating the sheet thickness middle portion to a two-phase region of ferrite and austenite. In addition, when the heating temperature in the annealing step is set to 900° C. or lower, it is possible to maintain the needle-like structure of austenite.

The Ac3 point is obtained from the following (Equation 1).

$$Ac3=910-203\sqrt{C}+44.7Si-25(Mn+Cr)+700P-20Cu-15.2Ni+31.5Mo+400Ti+104V+120Al \quad \text{(Equation 1)}$$

Here, C, Si, Mn, P, Cu, Ni, Cr, Mo, Ti, V, and Al are each the amount [mass %] of each element.

(Annealing Cooling Step)

The steel sheet after the annealing step is cooled in a temperature range of 750° C. or lower and 550° C. or higher (hereinafter, referred to as the second temperature range) at an average cooling rate of 2.5° C./second or faster and 50° C./second or slower. When the cooling rate in the second temperature range is controlled within this range, desired epitaxial ferrite is formed around the ferrite. In the present embodiment, a certain amount of Al is contained, whereby the formation of epitaxial ferrite is accelerated. When the average cooling rate is set to 2.5° C./second or faster, ferrite is excessively formed, which makes it possible to suppress the lack of the strength of the steel sheet. The lower limit of the average cooling rate is preferably 5° C./second and more preferably 10° C./second. In addition, when the average cooling rate is set to 50° C./second or slower, a sufficient amount of epitaxial ferrite can be formed. Therefore, the upper limit of the average cooling rate is preferably 40° C./second. A point in time where the steel sheet is removed from a soaking furnace is regarded as the starting time of the annealing cooling step, and any earlier point in time of a point in time where the steel sheet has passed through a cooling zone or a point in time where the temperature of the steel sheet has reached 550° C. is regarded as the ending time of the annealing cooling step.

In a case where the Al content is not sufficient, even when the average cooling rate is controlled to be 2.5° C./second or faster and 50° C./second or slower, epitaxial ferrite is not sufficiently formed.

At temperatures higher than 750° C., the average cooling rate at which ferritic transformation and pearlitic transformation can be suppressed can be appropriately controlled in order to obtain a desired metallographic structure proportion. In addition, at temperatures lower than 550° C., the average cooling rate can be appropriately controlled in order to obtain a desired fraction of a hard structure. In a temperature range of 550° C. or lower, the steel sheet is more preferably cooled to 100° C. or lower at an average cooling rate of 20° C./second or faster in order to obtain martensite as a hard structure. In addition, in order to obtain bainite as a hard structure, isothermal holding may be performed for 10 seconds or longer in a temperature range of 150° C. or higher and 550° C. or lower.

Hot-dip galvanizing or electrogalvanizing may be performed on the surface of the steel sheet after the annealing cooling step. This makes it possible to obtain a hot-dip galvanized steel sheet. In a case where hot-dip galvanizing is performed, the temperature of a hot-dip galvanizing bath into which the steel sheet is immersed may be a condition that has been conventionally applied. That is, the temperature of the hot-dip galvanizing bath is set to, for example, 440° C. or higher and 550° C. or lower.

In addition, a heat alloying treatment may be performed after the hot-dip galvanizing is performed as described above. This makes it possible to obtain a hot-dip galvannealed steel sheet. The heating temperature during the alloying in the case of performing the heat alloying treatment may be a condition that has been conventionally applied. That is, the heating temperature during the alloying is set to, for example, 300° C. or higher and 600° C. or lower. A heating method during the alloying is not particularly limited, and heating methods adapted to conventional hot-dip plating facilities such as direct heating with combustion gas, induction heating, and direct energization heating can be used. After the alloying treatment, the steel sheet is cooled to 200° C. or lower and temper-rolled as necessary.

In addition, as a method for manufacturing an electrolytic zinc-plated steel sheet, the following example is exemplified. For example, as a pretreatment of plating, alkaline degreasing, water washing, pickling, and water washing are performed on the above-described steel sheet. After that, an electrolytic treatment is performed on the steel sheet after the pretreatment until a predetermined plate thickness is reached at a current density of approximately 100 A/dm$^2$ using, for example, a liquid circulation-type electro plating device and a plating bath composed of zinc sulfate, sodium sulfate, and sulfuric acid.

EXAMPLES

The present embodiment will be described more specifically with reference to examples.

<Manufacturing Method>

Slabs having a chemical composition shown in Table 1-1 and Table 1-2 were cast. A hot rolling step, a cooling step, and a coiling step were performed on the cast slabs under conditions shown in Table 2-1 to Table 2-3. After pickling, the cast slabs were cold-rolled at rolling reductions shown in Table 2-1 to Table 2-3. After the cold rolling step, an annealing step and an annealing cooling step were performed on the cold-rolled steel sheets under conditions shown in Table 2-1 to Table 2-3.

In some of the examples, hot-dip galvanizing and an alloying treatment were performed after the annealing step.

TABLE 1-1

| No. | C | Si | Mn + Cr | Mn | Al | P | S | N | O | Mo | Ti | Nb | B | V | Cu | Note |
|---|---|---|---|---|---|---|---|---|---|---|---|---|---|---|---|---|
| a | 0.332 | 0.86 | 1.99 | 1.58 | 0.56 | 0.025 | 0.003 | 0.003 | 0.004 | | | | | | | Invention Example |
| b | 0.367 | 2.29 | 2.72 | 2.72 | 0.44 | 0.086 | 0.003 | 0.002 | 0.005 | | 0.023 | | 0.002 | | | Invention Example |
| c | 0.190 | 0.16 | 1.23 | 1.23 | 0.22 | 0.009 | 0.028 | 0.002 | 0.001 | | | | | | | Invention Example |
| d | 0.112 | 1.39 | 1.94 | 1.94 | 0.48 | 0.052 | 0.006 | 0.001 | 0.001 | 0.060 | | | | | | Invention Example |
| e | 0.181 | 1.56 | 2.46 | 2.46 | 0.46 | 0.016 | 0.012 | 0.001 | 0.001 | | 0.008 | 0.013 | | | | Invention Example |
| f | 0.120 | 0.32 | 2.90 | 2.74 | 0.52 | 0.017 | 0.004 | 0.005 | 0.003 | | | 0.032 | | 0.054 | 0.753 | Invention Example |
| g | 0.283 | 1.46 | 2.60 | 2.60 | 0.90 | 0.009 | 0.004 | 0.009 | 0.000 | | | | | | | Invention Example |
| h | 0.154 | 0.62 | 3.96 | 3.59 | 1.73 | 0.009 | 0.006 | 0.001 | 0.000 | | | | | | | Invention Example |
| i | 0.137 | 0.51 | 2.24 | 2.24 | 0.42 | 0.075 | 0.004 | 0.008 | 0.001 | | | 0.104 | | 0.078 | 0.140 | Invention Example |
| j | 0.232 | 1.13 | 3.08 | 3.08 | 0.42 | 0.007 | 0.037 | 0.001 | 0.000 | 0.023 | | | | | | Invention Example |
| k | 0.131 | 0.94 | 3.31 | 2.86 | 1.41 | 0.007 | 0.009 | 0.001 | 0.002 | | 0.018 | | 0.002 | | | Invention Example |
| l | 0.036 | 1.76 | 3.12 | 2.86 | 0.33 | 0.008 | 0.041 | 0.008 | 0.004 | | | 0.015 | | 0.059 | 0.108 | Comparative Example |
| m | 0.513 | 1.03 | 1.52 | 1.52 | 0.73 | 0.076 | 0.007 | 0.008 | 0.005 | | 0.027 | 0.035 | 0.001 | | | Comparative Example |
| n | 0.137 | 0.39 | 1.14 | 1.14 | 0.39 | 0.081 | 0.005 | 0.001 | 0.001 | 0.165 | | | | 0.042 | | Comparative Example |
| o | 0.174 | 1.21 | 4.10 | 4.10 | 0.74 | 0.008 | 0.004 | 0.001 | 0.003 | 0.027 | | | | 0.057 | | Comparative Example |
| p | 0.374 | 1.29 | 2.33 | 2.33 | 0.06 | 0.010 | 0.018 | 0.001 | 0.005 | | | | | | | Comparative Example |
| q | 0.422 | 0.12 | 3.94 | 3.49 | 2.07 | 0.018 | 0.034 | 0.003 | 0.001 | | | | | | | Comparative Example |

TABLE 1-2

| No. | W | Ta | Ni | Sn | Co | Sb | As | Mg | Ca | Y | Zr | La | Ce | Ac3 (° C.) | Ac3 − 100 (° C.) | Note |
|---|---|---|---|---|---|---|---|---|---|---|---|---|---|---|---|---|
| a | | | | | | | | | | | | | | 866 | 766 | Invention Example |
| b | | | | | | | | | | | | | | 944 | 844 | Invention Example |
| c | | | | | | | | | | | | | | 831 | 731 | Invention Example |
| d | | | | | | | | | | | | | | 952 | 852 | Invention Example |
| e | | | | | | | | | | | | | | 901 | 801 | Invention Example |

TABLE 1-2-continued

| No. | W | Ta | Ni | Sn | Co | Sb | As | Mg | Ca | Y | Zr | La | Ce | Ac3 (° C.) | Ac3 − 100 (° C.) | Note |
|---|---|---|---|---|---|---|---|---|---|---|---|---|---|---|---|---|
| f |  |  |  |  |  |  |  |  |  |  |  |  |  | 846 | 746 | Invention Example |
| g |  |  |  |  |  |  |  |  |  |  |  |  |  | 917 | 817 | Invention Example |
| h |  |  |  |  |  |  |  |  |  |  |  |  |  | 973 | 873 | Invention Example |
| i |  |  |  |  |  | 0.003 | 0.006 | 0.008 | 0.012 | 0.004 | 0.043 | 0.005 |  | 910 | 810 | Invention Example |
| j |  |  | 0.099 | 0.003 |  |  |  |  |  |  |  |  |  | 840 | 740 | Invention Example |
| k | 0.012 | 0.009 | 0.037 | 0.026 | 0.081 |  |  |  |  |  |  |  |  | 977 | 877 | Invention Example |
| l |  |  | 0.131 |  | 0.030 |  |  |  |  |  | 0.003 | 0.008 | 0.003 0.003 | 919 | 819 | Comparative Example |
| m |  |  |  |  |  |  |  |  |  |  |  |  |  | 924 | 824 | Comparative Example |
| n | 0.010 | 0.080 |  |  |  |  |  | 0.006 | 0.005 | 0.016 |  |  |  | 937 | 837 | Comparative Example |
| o |  |  |  |  |  |  |  |  |  |  |  |  |  | 878 | 778 | Comparative Example |
| p |  |  |  |  |  |  |  |  |  |  |  |  |  | 799 | 699 | Comparative Example |
| q |  |  |  |  |  |  |  |  |  |  |  |  |  | 946 | 846 | Comparative Example |

TABLE 2-1

| | | Hot rolling step | | | | | | |
|---|---|---|---|---|---|---|---|---|
| Steel type | No. | Rolling start temperature at third rolling stand from finish rolling stand (° C.) | Rolling reduction in third rolling stand from back (%) | Rolling reduction in second rolling stand from back (%) | Rolling reduction in first rolling stand from back (%) | Maximum value of pass time between stands in last three rolling stands in finish rolling (seconds) | Minimum value of (n-th exiting-side temperature Tn) − (n + 1-th entering-side temperature Tn + 1) in last three rolling stands in finish rolling (° C.) | Prior austenite grain size (μm) |
| a | 1 | 846 | 31 | 23 | 16 | 2.7 | 18 | 22 |
| b | 2 | 973 | 29 | 32 | 19 | 2.7 | 16 | 19 |
| c | 3 | 964 | 32 | 29 | 29 | 2.7 | 14 | 12 |
| d | 4 | 989 | 18 | 39 | 12 | 0.3 | 12 | 18 |
| e | 5 | 829 | 13 | 26 | 35 | 0.5 | 16 | 27 |
| f | 6 | 926 | 12 | 13 | 39 | 1.6 | 18 | 21 |
| g | 7 | 834 | 38 | 25 | 16 | 2.6 | 17 | 13 |
| h | 8 | 984 | 17 | 20 | 28 | 2.6 | 13 | 21 |
| i | 9 | 989 | 34 | 32 | 32 | 2.8 | 11 | 12 |
| j | 10 | 984 | 37 | 34 | 31 | 2.3 | 19 | 11 |
| k | 11 | 975 | 24 | 16 | 23 | 0.4 | 15 | 21 |
| a | 12 | 987 | 27 | 37 | 25 | 2.7 | 14 | 23 |
| b | 13 | 870 | 21 | 21 | 13 | 2.7 | 20 | 14 |
| c | 14 | 980 | 23 | 17 | 20 | 0.8 | 13 | 29 |
| d | 15 | 988 | 14 | 11 | 37 | 0.3 | 12 | 16 |
| e | 16 | 981 | 31 | 22 | 13 | 2.8 | 15 | 20 |
| f | 17 | 984 | 20 | 39 | 12 | 0.4 | 18 | 15 |
| g | 18 | 985 | 29 | 11 | 35 | 2.8 | 11 | 17 |
| h | 19 | 983 | 24 | 14 | 39 | 2.2 | 12 | 17 |
| i | 20 | 960 | 16 | 37 | 25 | 0.5 | 17 | 19 |

TABLE 2-1-continued

| | | Cooling step | | | Cold rolling step | Annealing step | | Annealing cooling step |
|---|---|---|---|---|---|---|---|---|
| | | Average cooling rate after hot rolling | Cooling stop temperature after hot rolling | Coiling step | Cold rolling reduction | Holding temperature | Soaking time | Cooling rate from 750° C. to 550° C. |
| Steel type | No. | (° C./s) | (° C.) | Coiling temperature (° C.) | (%) | (° C.) | (sec) | (° C./s) |
| a | 1  | 51 | 474 | 158 | 11 | 834 | 392 | 37 |
| b | 2  | 53 | 349 | 40  | 2  | 846 | 307 | 47 |
| c | 3  | 40 | 182 | 160 | 13 | 789 | 300 | 7  |
| d | 4  | 56 | 57  | 25  | 22 | 884 | 144 | 17 |
| e | 5  | 57 | 396 | 354 | 24 | 832 | 212 | 20 |
| f | 6  | 28 | 225 | 55  | 14 | 813 | 161 | 33 |
| g | 7  | 58 | 238 | 95  | 3  | 837 | 394 | 23 |
| h | 8  | 57 | 459 | 253 | 27 | 891 | 397 | 13 |
| i | 9  | 54 | 281 | 259 | 16 | 849 | 331 | 4  |
| j | 10 | 24 | 25  | 25  | 19 | 820 | 100 | 45 |
| k | 11 | 56 | 111 | 82  | 24 | 898 | 172 | 42 |
| a | 12 | 24 | 428 | 339 | 28 | 806 | 394 | 11 |
| b | 13 | 57 | 71  | 30  | 8  | 897 | 363 | 25 |
| c | 14 | 32 | 330 | 330 | 8  | 748 | 207 | 31 |
| d | 15 | 25 | 152 | 116 | 6  | 887 | 368 | 39 |
| e | 16 | 54 | 156 | 147 | 9  | 822 | 301 | 22 |
| f | 17 | 51 | 473 | 426 | 21 | 809 | 188 | 19 |
| g | 18 | 26 | 418 | 329 | 4  | 846 | 181 | 5  |
| h | 19 | 56 | 199 | 46  | 23 | 884 | 154 | 17 |
| i | 20 | 23 | 210 | 115 | 24 | 835 | 140 | 40 |

TABLE 2-2

| | | Hot rolling step | | | | | | |
|---|---|---|---|---|---|---|---|---|
| Steel type | No. | Rolling start temperature at third rolling stand from finish rolling stand (° C.) | Rolling reduction in third rolling stand from back (%) | Rolling reduction in second rolling stand from back (%) | Rolling reduction in first rolling stand from back (%) | Maximum value of pass time between stands in last three rolling stands in finish rolling (seconds) | Minimum value of (n-th exiting-side temperature Tn) − (n + 1-th entering-side temperature Tn + 1) in last three rolling stands in finish rolling (° C.) | Prior austenite grain size (μm) |
| j | 21 | 832 | 21 | 18 | 37 | 0.9 | 14 | 15 |
| k | 22 | 867 | 17 | 27 | 33 | 2.9 | 19 | 18 |
| a | 23 | 984 | 11 | 32 | 21 | 0.3 | 14 | 15 |
| b | 24 | 983 | 33 | 19 | 27 | 2.7 | 17 | 21 |
| c | 25 | 982 | 25 | 13 | 31 | 2.8 | 18 | 13 |
| d | 26 | 846 | 40 | 33 | 19 | 1.7 | 16 | 20 |
| e | 27 | 984 | 13 | 25 | 22 | 0.3 | 11 | 18 |
| f | 28 | 971 | 26 | 36 | 15 | 2.6 | 12 | 25 |
| g | 29 | 933 | 37 | 20 | 17 | 2.8 | 13 | 13 |
| h | 30 | 821 | 36 | 29 | 29 | 2.5 | 19 | 11 |
| i | 31 | 986 | 26 | 37 | 27 | 2.7 | 15 | 25 |
| j | 32 | 964 | 29 | 28 | 36 | 0.5 | 18 | 27 |
| k | 33 | 989 | 18 | 16 | 32 | 0.5 | 11 | 17 |
| a | 34 | 927 | 39 | 23 | 11 | 2.4 | 14 | 24 |
| b | 35 | 980 | 34 | 31 | 14 | 0.8 | 20 | 19 |

TABLE 2-2-continued

| Steel type | No. | | | | | | | |
|---|---|---|---|---|---|---|---|---|
| c | 36 | 984 | 17 | 21 | 30 | 0.3 | 12 | 29 |
| d | 37 | 984 | 28 | 19 | 20 | 2.8 | 17 | 13 |
| e | 38 | 867 | 31 | 17 | 14 | 2.7 | 18 | 12 |
| f | 39 | 986 | 20 | 12 | 30 | 2.8 | 14 | 13 |
| g | 40 | 974 | 37 | 34 | 38 | 2.3 | 13 | 25 |

| | | Cooling step | | | Cold rolling step Cold | Annealing step | | Annealing cooling step Cooling rate |
|---|---|---|---|---|---|---|---|---|
| Steel type | No. | Average cooling rate after hot rolling (° C./s) | Cooling stop temperature after hot rolling (° C.) | Coiling step Coiling temperature (° C.) | Cold rolling reduction (%) | Holding temperature (° C.) | Soaking time (sec) | from 750° C. to 550° C. (° C./s) |
| j | 21 | 25 | 15 | 15 | 4 | 781 | 61 | 33 |
| k | 22 | 30 | 53 | 26 | 19 | 882 | 200 | 45 |
| a | 23 | 56 | 369 | 413 | 13 | 786 | 399 | 8 |
| b | 24 | 58 | 237 | 60 | 15 | 878 | 397 | 36 |
| c | 25 | 56 | 349 | 97 | 8 | 778 | 88 | 28 |
| d | 26 | 26 | 110 | 101 | 1 | 886 | 58 | 14 |
| e | 27 | 58 | 433 | 442 | 17 | 832 | 329 | 42 |
| f | 28 | 56 | 76 | 47 | 28 | 837 | 399 | 48 |
| g | 29 | 57 | 307 | 59 | 29 | 824 | 188 | 11 |
| h | 30 | 40 | 280 | 274 | 12 | 885 | 181 | 28 |
| i | 31 | 55 | 250 | 78 | 4 | 854 | 394 | 31 |
| j | 32 | 58 | 230 | 170 | 6 | 791 | 156 | 12 |
| k | 33 | 56 | 35 | 25 | 29 | 891 | 99 | 20 |
| a | 34 | 40 | 479 | 439 | 14 | 806 | 395 | 22 |
| b | 35 | 55 | 45 | 49 | 22 | 849 | 247 | 34 |
| c | 36 | 24 | 426 | 50 | 18 | 790 | 70 | 47 |
| d | 37 | 32 | 354 | 307 | 14 | 887 | 314 | 27 |
| e | 38 | 27 | 327 | 61 | 0.3 | 821 | 78 | 38 |
| f | 39 | 53 | 145 | 27 | 26 | 840 | 256 | 4 |
| g | 40 | 57 | 84 | 74 | 21 | 846 | 400 | 45 |

TABLE 2-3

| | | Hot rolling step | | | | | | |
|---|---|---|---|---|---|---|---|---|
| Steel type | No. | Rolling start temperature at third rolling stand from finish rolling stand (° C.) | Rolling reduction in third rolling stand from back (%) | Rolling reduction in second rolling stand from back (%) | Rolling reduction in first rolling stand from back (%) | Maximum value of pass time between stands in last three rolling stands in finish rolling (seconds) | Minimum value of (n-th exiting-side temperature Tn) − (n + 1-th entering-side temperature Tn + 1) in last three rolling stands in finish rolling (° C.) | Prior austenite grain size (μm) |
| h | 41 | 819 | 15 | 28 | 35 | 1.5 | 19 | 18 |
| i | 42 | 833 | 22 | 33 | 21 | 2.7 | 16 | 12 |
| j | 43 | 988 | 12 | 14 | 16 | 2.5 | 13 | 14 |
| l | 44 | 840 | 14 | 39 | 23 | 0.4 | 12 | 17 |

TABLE 2-3-continued

| Steel type | No. | | | | | | | |
|---|---|---|---|---|---|---|---|---|
| m | 45 | 979 | 21 | 29 | 20 | 2.9 | 14 | 21 |
| n | 46 | 934 | 15 | 35 | 28 | 1.6 | 18 | 16 |
| o | 47 | 984 | 33 | 14 | 11 | 2.8 | 15 | 19 |
| p | 48 | 991 | 26 | 31 | 30 | 0.9 | 12 | 26 |
| q | 49 | Al-induced embrittlement was significant, the slab cracked, and thus the test was stopped thereafter. | | | | | | |
| a | 50 | 792 | Since the rolling start temperature was low and the rolling load increased, which made rolling impossible, the test was stopped thereafter. | | | | | |
| b | 50' | 1008 | 14 | 24 | 33 | 0.5 | 11 | 19 |
| c | 51 | 984 | 8 | 38 | 20 | 2.5 | 15 | 33 |
| e | 52 | 867 | 26 | 9 | 10 | 2.4 | 17 | 36 |
| g | 53 | 967 | 37 | 27 | 6 | 0.7 | 13 | 31 |
| i | 54 | 981 | 22 | 14 | 22 | 3.1 | 11 | 34 |
| j | 55 | 968 | 29 | 12 | 28 | 2.8 | 8 | 31 |
| k | 56 | 983 | 24 | 13 | 20 | 1.9 | 12 | 16 |
| b | 57 | 990 | 19 | 32 | 13 | 2.7 | 14 | 13 |
| d | 58 | 977 | 34 | 26 | 24 | 0.2 | 12 | 24 |
| f | 59 | 975 | 32 | 36 | 26 | 2.8 | 13 | 17 |
| g | 60 | 835 | 19 | 30 | 39 | 2.7 | 15 | 14 |
| a | 61 | 821 | 31 | 16 | 15 | 0.6 | 13 | 17 |
| i | 62 | 828 | 12 | 19 | 34 | 0.3 | 13 | 20 |
| j | 63 | 845 | 25 | 23 | 23 | 2.6 | 17 | 21 |

| | | Cooling step | | | | Annealing step | | Annealing cooling step |
|---|---|---|---|---|---|---|---|---|
| Steel type | No. | Average cooling rate after hot rolling (°C./s) | Cooling stop temperature after hot rolling (°C.) | Coiling step Coiling temperature (°C.) | Cold rolling step Cold rolling reduction (%) | Holding temperature (°C.) | Soaking time (sec) | Cooling rate from 750° C. to 550° C. (°C./s) |
| h | 41 | 57 | 177 | 137 | 12 | 888 | 95 | 43 |
| i | 42 | 57 | 393 | 349 | 26 | 836 | 394 | 18 |
| j | 43 | 23 | 281 | 66 | 9 | 824 | 331 | 13 |
| l | 44 | 24 | 445 | 399 | 6 | 873 | 369 | 47 |
| m | 45 | 55 | 139 | 145 | 15 | 891 | 356 | 45 |
| n | 46 | 55 | 404 | 59 | 1 | 857 | 385 | 20 |
| o | 47 | 57 | 320 | 159 | 12 | 816 | 399 | 12 |
| p | 48 | 41 | 82 | 33 | 8 | 778 | 371 | 47 |
| q | 49 | Al-induced embrittlement was significant, the slab cracked, and thus the test was stopped thereafter. | | | | | | |
| a | 50 | Since the rolling start temperature was low and the rolling load increased, which made rolling impossible, the test was stopped thereafter. | | | | | | |
| b | 50' | 46 | 61 | 143 | 13 | 886 | 282 | 12 |
| c | 51 | 52 | 285 | 67 | 7 | 836 | 179 | 44 |
| e | 52 | 57 | 180 | 103 | 21 | 819 | 147 | 37 |
| g | 53 | 56 | 364 | 317 | 20 | 836 | 67 | 40 |
| i | 54 | 26 | 410 | 232 | 17 | 838 | 158 | 14 |
| j | 55 | 58 | 465 | 46 | 4 | 760 | 171 | 43 |
| k | 56 | 19 | 116 | 79 | 27 | 878 | 140 | 31 |
| b | 57 | 28 | 513 | 434 | 2 | 866 | 265 | 21 |
| d | 58 | 58 | 499 | 532 | 2 | 889 | 390 | 49 |
| f | 59 | 32 | 241 | 68 | 34 | 836 | 400 | 8 |
| g | 60 | 24 | 170 | 39 | 24 | 744 | 365 | 23 |
| a | 61 | 55 | 86 | 64 | 27 | 904 | 51 | 35 |
| i | 62 | 58 | 210 | 173 | 18 | 830 | 302 | 1 |
| j | 63 | 25 | 136 | 133 | 21 | 816 | 283 | 56 |

<Measurement of Metallographic Structure>

Test pieces for SEM observation were collected from the obtained annealed steel sheets, cross sections parallel to the rolling direction and the sheet thickness direction were polished, each structure was identified by the following method, and the volume percentage was measured. The volume percentage of each structure is shown in Table 3-1 to Table 3-3.

The volume percentage of residual austenite was calculated by measuring diffraction intensities using X-rays.

In the measurement using X-rays, a portion from the sheet surface of the sample to a depth ¼ position was removed by mechanical polishing and chemical polishing. The microstructural fraction of the residual austenite was calculated from the integrated intensity ratio of the diffraction peaks of (200) and (211) of a bcc phase and (200), (220), and (311) of an fcc phase using MoKα rays at the sheet thickness ¼ position. As a general calculation method, a five-peak method was used.

Pearlite was identified in the following order. An observed section of the sample was corroded with a Nital reagent, and a 100 μm×100 μm region in a sheet thickness ⅛ to ⅜ range in which the sheet thickness ¼ was centered was observed using the FE-SEM at a magnification of 3000 times. From the position of cementite that was included in the structure and the arrangement of cementite, a region where ferrite and cementite were arranged in a lamellar shape was discriminated as pearlite. The area ratio was obtained by performing image analysis using image analysis software ImageJ.

Ferrite and epitaxial ferrite were identified in the following order. An observed section of the sample was corroded with, particularly, a liquid mixture of 3% nitric acid and ethanol as a Nital reagent, and a 100 μm×100 μm region in the sheet thickness ⅛ to ⅜ range in which the sheet thickness ¼ was centered was observed using the FE-SEM at a magnification of 3000 times. Portions with uniform contrast (portions that did not include substructures such as blocks and packets, cementite, or residual austenite in the crystal grains and appeared in a single uniform contrast) were determined as ferrite and epitaxial ferrite. The area ratios calculated by image analysis using the image analysis software Image J were regarded as the area ratios of ferrite and epitaxial ferrite.

In order to distinguish ferrite and epitaxial ferrite, the observation conditions were set to an accelerating voltage of 15 kV and a WD of 10 mm. In an observation image image-analyzed using the image analysis software ImageJ, a structure with a brightness having peaks at 85% or more of the total was determined as martensite, a structure having peaks at 60% or more and less than 85% was determined as ferrite, and a structure having peaks at 45% or more and less than 60% was determined as epitaxial ferrite. Therefore, it was possible to distinguish ferrite and epitaxial ferrite and to calculate the proportion of epitaxial ferrite in the ferrite and epitaxial ferrite.

Bainite was identified in the following order. An observed section of the sample was etched with a LePera solution, and a 100 μm×100 μm region in the sheet thickness ⅛ to ⅜ range in which the sheet thickness ¼ was centered was observed using the FE-SEM at a magnification of 3000 times. From the position of cementite that was included in the structure and the arrangement of cementite, bainite was discriminated. Specifically, cementite having a plurality of variants was discriminated as bainite, and the area ratio was obtained using the image analysis software ImageJ.

Martensite was identified in the following order. An observed section of sample was etched with via LePera solution, and a 100 μm×100 μm region in the sheet thickness ⅛ to ⅜ range in which the sheet thickness ¼ was centered was observed using the FE-SEM at a magnification of 3000 times. Since it was difficult to corrode martensite and residual austenite by LePera corrosion, the total area ratio of martensite and residual austenite was regarded as the area ratio of these structures. The area ratio of martensite was calculated by obtaining the area ratios of these uncorroded regions using the image analysis software ImageJ and subtracting the volume percentage of residual austenite measured by X-rays.

<A/B, ratio of length A of interface between epitaxial ferrite and ferrite to length B of interface between epitaxial ferrite and martensite in cross section in direction perpendicular to rolling direction>

A/B that was the ratio between the length A of an interface between the epitaxial ferrite and the ferrite and the length B of an interface between the epitaxial ferrite and the martensite was measured by the following method.

As described above, the region of each structure was identified with the image processing software, and the ratio between the length A of an interface between the epitaxial ferrite and the ferrite and the length B of an interface between the epitaxial ferrite and the martensite, which were obtained with the image processing software, was regarded as A/B.

The results are shown in Table 3.

<Ratio of Major Axis to Minor Axis of Martensite>

The ratio of the major axis to the minor axis (aspect ratio) of martensite was measured by the following method.

The area of each martensite grain specified by the above-described image processing was measured. Next, the major axis in each martensite grain was measured. Here, the major axis was defined as the maximum length of line segments that connected two points on the periphery of the martensite grain. Subsequently, for each martensite grain, a value obtained by dividing the area by the major axis was calculated as the minor axis. Finally, for each martensite grain, the rate of the major axis relative to the minor axis was calculated, and the average value thereof was obtained.

The results are shown in Table 3-1 to Table 3-3.

<Tensile Strength>

The tensile strength was measured by collecting a JIS No. 5 tensile test piece from the steel sheet in a direction perpendicular to the rolling direction and performing a tensile test in accordance with JIS Z 2241: 2011.

The measurement results of the tensile strength are shown in Table 3-1 to Table 3-3.

<Difference in 0.2% Proof Stress (YP) Between Strain Rates of 0.001/Second and 0.01/Second>

As the difference in 0.2% proof stress (YP) between strain rates of 0.001/second and 0.01/second, a JIS No. 5 tensile test piece described in JIS Z 2201 was collected from the steel sheet in a direction perpendicular to the rolling direction, and a difference between YP at a strain rate of 0.001/second and YP at 0.01/second was obtained.

TABLE 3-1

| | | Structural fraction (%) | | | | | | Ratio | | Mechanical characteristics | | |
| --- | --- | --- | --- | --- | --- | --- | --- | --- | --- | --- | --- | --- |
| Steel type | No. | Ferrite + epitaxial ferrite | Proportion of epitaxial ferrite in ferrite + epitaxial ferrite | Martensite | Bainite | Residual austenite | Remainder | between interface lengths A/B | Martensite Aspect ratio | Strength (MPa) | Increase in yield point (MPa) | Note |
| a | 1 | 23 | 16 | 37 | 38 | 1 | 1 | 1.7 | 9.0 | 1453 | 9 | Invention Example |
| b | 2 | 42 | 11 | 41 | 13 | 0 | 4 | 1.9 | 9.0 | 1244 | 12 | Invention Example |
| c | 3 | 26 | 13 | 30 | 30 | 10 | 4 | 1.7 | 10.0 | 1107 | 10 | Invention Example |
| d | 4 | 21 | 18 | 32 | 36 | 9 | 2 | 1.7 | 5.0 | 981 | 10 | Invention Example |

TABLE 3-1-continued

| | | Structural fraction (%) | | | | | | Ratio between interface lengths A/B | Martensite Aspect ratio | Mechanical characteristics | | |
|---|---|---|---|---|---|---|---|---|---|---|---|---|
| | | | Proportion of epitaxial | | | | | | | | | |
| Steel type | No. | Ferrite + epitaxial ferrite | ferrite in ferrite + epitaxial ferrite | Martensite | Bainite | Residual austenite | Remainder | | | Strength (MPa) | Increase in yield point (MPa) | Note |
| e | 5 | 17 | 13 | 33 | 33 | 13 | 4 | 1.8 | 9.0 | 1055 | 9 | Invention Example |
| f | 6 | 35 | 15 | 25 | 39 | 0 | 1 | 2.2 | 12.0 | 985 | 14 | Invention Example |
| g | 7 | 42 | 21 | 41 | 13 | 0 | 4 | 2.0 | 12.0 | 1132 | 12 | Invention Example |
| h | 8 | 17 | 14 | 45 | 37 | 0 | 1 | 2.1 | 11.0 | 1131 | 13 | Invention Example |
| i | 9 | 30 | 14 | 60 | 7 | 0 | 3 | 1.9 | 7.0 | 995 | 12 | Invention Example |
| j | 10 | 36 | 10 | 24 | 38 | 0 | 2 | 2.1 | 12.0 | 1066 | 12 | Invention Example |
| k | 11 | 29 | 16 | 56 | 13 | 0 | 2 | 2.1 | 12.0 | 986 | 13 | Invention Example |
| a | 12 | 31 | 18 | 27 | 32 | 7 | 3 | 1.9 | 7.0 | 1309 | 10 | Invention Example |
| b | 13 | 20 | 10 | 40 | 30 | 7 | 3 | 2.0 | 11.0 | 1581 | 11 | Invention Example |
| c | 14 | 36 | 11 | 27 | 33 | 0 | 4 | 2.1 | 11.0 | 994 | 13 | Invention Example |
| d | 15 | 22 | 16 | 47 | 27 | 0 | 4 | 1.9 | 8.0 | 992 | 10 | Invention Example |
| e | 16 | 24 | 12 | 42 | 30 | 0 | 4 | 1.7 | 10.0 | 987 | 10 | Invention Example |
| f | 17 | 32 | 16 | 39 | 26 | 0 | 3 | 1.9 | 12.0 | 1035 | 10 | Invention Example |
| g | 18 | 28 | 11 | 23 | 35 | 11 | 3 | 2.1 | 11.0 | 1143 | 13 | Invention Example |
| h | 19 | 28 | 13 | 34 | 36 | 0 | 2 | 1.8 | 6.0 | 1013 | 11 | Invention Example |
| i | 20 | 31 | 11 | 43 | 10 | 14 | 2 | 2.1 | 11.0 | 984 | 13 | Invention Example |

TABLE 3-2

| | | Structural fraction (%) | | | | | | Ratio between interface lengths A/B | Martensite Aspect ratio | Mechanical characteristics | | |
|---|---|---|---|---|---|---|---|---|---|---|---|---|
| | | | Proportion of epitaxial | | | | | | | | | |
| Steel type | No. | Ferrite + epitaxial ferrite | ferrite in ferrite + epitaxial ferrite | Martensite | Bainite | Residual austenite | Remainder | | | Strength (MPa) | Increase in yield point (MPa) | Note |
| j | 21 | 38 | 12 | 28 | 21 | 10 | 3 | 1.8 | 6.0 | 1086 | 11 | Invention Example |
| k | 22 | 26 | 13 | 25 | 34 | 14 | 1 | 1.7 | 9.0 | 997 | 10 | Invention Example |
| a | 23 | 41 | 18 | 22 | 21 | 12 | 4 | 2.2 | 12.0 | 1079 | 14 | Invention Example |
| b | 24 | 33 | 12 | 30 | 34 | 0 | 3 | 2.1 | 11.0 | 1366 | 9 | Invention Example |
| c | 25 | 32 | 12 | 24 | 31 | 11 | 2 | 2.0 | 10.0 | 1075 | 11 | Invention Example |
| d | 26 | 23 | 18 | 52 | 24 | 0 | 1 | 2.1 | 12.0 | 990 | 13 | Invention Example |
| e | 27 | 16 | 11 | 34 | 35 | 12 | 3 | 2.0 | 10.0 | 1056 | 12 | Invention Example |
| f | 28 | 31 | 14 | 27 | 30 | 10 | 2 | 1.7 | 11.0 | 1031 | 10 | Invention Example |
| g | 29 | 41 | 28 | 20 | 22 | 13 | 4 | 1.8 | 6.0 | 1006 | 11 | Invention Example |

TABLE 3-2-continued

| Steel type | No. | Structural fraction (%) Ferrite + epitaxial ferrite | Proportion of epitaxial ferrite in ferrite + epitaxial ferrite | Martensite | Bainite | Residual austenite | Remainder | Ratio between interface lengths A/B | Martensite Aspect ratio | Mechanical characteristics Strength (MPa) | Increase in yield point (MPa) | Note |
|---|---|---|---|---|---|---|---|---|---|---|---|---|
| h | 30 | 15 | 11 | 39 | 30 | 13 | 3 | 2.0 | 10.0 | 1154 | 12 | Invention Example |
| i | 31 | 27 | 11 | 36 | 33 | 0 | 4 | 2.1 | 12.0 | 990 | 9 | Invention Example |
| j | 32 | 32 | 11 | 24 | 30 | 12 | 2 | 2.1 | 11.0 | 1066 | 13 | Invention Example |
| k | 33 | 29 | 13 | 47 | 10 | 10 | 4 | 1.7 | 12.0 | 992 | 10 | Invention Example |
| a | 34 | 28 | 17 | 34 | 31 | 7 | 0 | 1.9 | 11.0 | 1311 | 9 | Invention Example |
| b | 35 | 32 | 12 | 29 | 26 | 11 | 2 | 2.0 | 9.0 | 1150 | 10 | Invention Example |
| c | 36 | 28 | 10 | 32 | 30 | 8 | 2 | 2.1 | 11.0 | 1084 | 13 | Invention Example |
| d | 37 | 25 | 11 | 44 | 16 | 12 | 3 | 2.0 | 12.0 | 982 | 12 | Invention Example |
| e | 38 | 27 | 12 | 34 | 28 | 11 | 0 | 1.8 | 6.0 | 989 | 11 | Invention Example |
| f | 39 | 24 | 14 | 38 | 24 | 13 | 1 | 2.1 | 11.0 | 1134 | 13 | Invention Example |
| g | 40 | 48 | 26 | 47 | 3 | 0 | 2 | 2.2 | 12.0 | 1045 | 14 | Invention Example |

TABLE 3-3

| Steel type | No. | Structural fraction (%) Ferrite + epitaxial ferrite | Proportion of epitaxial ferrite in ferrite + epitaxial ferrite | Martensite | Bainite | Residual austenite | Remainder | Ratio between interface lengths A/B | Martensite Aspect ratio | Mechanical characteristics Strength (MPa) | Increase in yield point (MPa) | Note |
|---|---|---|---|---|---|---|---|---|---|---|---|---|
| h | 41 | 29 | 11 | 24 | 30 | 13 | 4 | 1.8 | 6.0 | 1000 | 11 | Invention Example |
| i | 42 | 29 | 12 | 24 | 33 | 12 | 2 | 1.7 | 7.0 | 988 | 10 | Invention Example |
| j | 43 | 13 | 13 | 47 | 30 | 7 | 3 | 1.7 | 11.0 | 1364 | 10 | Invention Example |
| l | 44 | 54 | 11 | 4 | 33 | 0 | 9 | 2.2 | 12.0 | 625 | 10 | Comparative Example |
| m | 45 | 27 | 21 | 63 | 0 | 6 | 4 | 2.2 | 12.0 | Ruptured in elastic region | — | Comparative Example |
| n | 46 | 44 | 10 | 17 | 31 | 0 | 8 | 2.1 | 11.0 | 826 | 12 | Comparative Example |
| o | 47 | 34 | 4 | 38 | 28 | 0 | 0 | 1.3 | 11.0 | 1001 | 5 | Comparative Example |
| p | 48 | 12 | 3 | 58 | 23 | 7 | 0 | 1.2 | 11.0 | 1734 | 4 | Comparative Example |
| q | 49 | — | — | — | — | — | — | — | — | — | — | Comparative Example |
| a | 50 | — | — | — | — | — | — | — | — | — | — | Comparative Example |
| b | 50' | 36 | 14 | 22 | 36 | 6 | 0 | 1.6 | 3.0 | 1366 | 4 | Comparative Example |
| c | 51 | 12 | 11 | 38 | 40 | 9 | 1 | 1.6 | 3.0 | 1271 | 4 | Comparative Example |
| e | 52 | 24 | 13 | 44 | 29 | 0 | 3 | 1.7 | 4.0 | 989 | 5 | Comparative Example |
| g | 53 | 34 | 23 | 26 | 28 | 11 | 1 | 1.8 | 3.0 | 1059 | 4 | Comparative Example |

TABLE 3-3-continued

| | | Structural fraction (%) | | | | | | Ratio | | Mechanical characteristics | | |
|---|---|---|---|---|---|---|---|---|---|---|---|---|
| | | | Proportion of epitaxial ferrite in ferrite + epitaxial ferrite | | | | | between interface lengths A/B | Martensite Aspect ratio | Strength (MPa) | Increase in yield point (MPa) | |
| Steel type | No. | Ferrite + epitaxial ferrite | | Martensite | Bainite | Residual austenite | Remainder | | | | | Note |
| i | 54 | 27 | 13 | 36 | 34 | 0 | 3 | 1.6 | 4.0 | 990 | 4 | Comparative Example |
| j | 55 | 37 | 11 | 21 | 39 | 0 | 3 | 1.6 | 4.0 | 1049 | 5 | Comparative Example |
| k | 56 | 22 | 22 | 39 | 36 | 0 | 3 | 1.8 | 3.0 | 1024 | 5 | Comparative Example |
| b | 57 | 41 | 13 | 35 | 20 | 0 | 4 | 1.7 | 3.0 | 1256 | 4 | Comparative Example |
| d | 58 | 24 | 19 | 69 | 3 | 0 | 4 | 1.7 | 4.0 | 1003 | 4 | Comparative Example |
| f | 59 | 29 | 17 | 28 | 27 | 12 | 4 | 1.6 | 2.0 | 1064 | 3 | Comparative Example |
| g | 60 | 73 | 0 | 0 | 23 | 0 | 4 | No martensite | | 300 | 5 | Comparative Example |
| a | 61 | 4 | 12 | 90 | 2 | 0 | 4 | 1.6 | 2.0 | 1877 | 5 | Comparative Example |
| i | 62 | 74 | 44 | 4 | 18 | 0 | 4 | 1.9 | 7.0 | 534 | 11 | Comparative Example |
| j | 63 | 15 | 4 | 72 | 9 | 0 | 4 | 1.3 | 11.0 | 1381 | 4 | Comparative Example |

As shown in Table 1-1 to Table 3-3, in the examples where the requirements of the present embodiment were satisfied, desired characteristics were obtained. On the other hand, in comparative examples where at least one of the requirements of the present embodiment was not satisfied, desired characteristics were not obtained. Specifically, the statuses are as described below.

In No. 44, since the amount of C was small, a desired metallographic structure could not be obtained, and a desired strength could not be obtained.

In No. 45, since the amount of C was large, the steel sheet ruptured in an elastic range in the tensile test.

In No. 46, since the total amount of Mn and Cr was small, a desired metallographic structure could not be obtained, and a desired strength could not be obtained.

In No. 47, since the total amount of Mn and Cr was large, epitaxial ferrite was not sufficiently formed, and a desired increase in the yield point could not be obtained.

In No. 48, since the amount of Al was small, epitaxial ferrite was not sufficiently formed, and a desired increase in the yield point could not be obtained.

In No. 49, since the amount of Al was large, Al-induced embrittlement was significant, the slab cracked, and thus the test was stopped thereafter.

In No. 50, since the rolling start temperature at a third rolling stand from the finish rolling stand was low, and the rolling load increased, which made rolling impossible, the test was stopped thereafter.

In No. 50', since the rolling start temperature at a third rolling stand from the finish rolling stand was high, the aspect ratio of the martensite failed to reach 5.0 or more, preferable epitaxial ferrite around the martensite could not be obtained, and a desired increase in the yield point could not be obtained.

In No. 51, since the rolling reduction in the third rolling stand from the back in the finish rolling was low, needle-shaped martensite and preferable epitaxial ferrite around the martensite could not be obtained, and a desired increase in the yield point could not be obtained.

In No. 52, since the rolling reductions in the second rolling stand from the back and the first rolling stand from the back (that is, the finish rolling stand) in the finish rolling were low, needle-shaped martensite and preferable epitaxial ferrite around the martensite could not be obtained, and a desired increase in the yield point could not be obtained.

In No. 53, since the rolling reduction in the first rolling stand from the back (that is, the finish rolling stand) in the finish rolling was low, needle-shaped martensite and preferable epitaxial ferrite around the martensite could not be obtained, and a desired increase in the yield point could not be obtained.

In No. 54, since the maximum value of the interpass times between the rolling stands was longer than 3.0 seconds, needle-shaped martensite and preferable epitaxial ferrite around the martensite could not be obtained, and a desired increase in the yield point could not be obtained.

In No. 55, since the maximum value of $(T_n - T_{n+1})$, which was the difference between the exiting-side temperature $T_n$ of the n-th rolling stand of the last three rolling stands and the entering-side temperature $T_{n+1}$ of the $(n+1)^{th}$ rolling stand of the last three rolling stands in the finish rolling, was 10° C. or smaller, needle-shaped martensite and preferable epitaxial ferrite around the martensite could not be obtained, and a desired increase in the yield point could not be obtained.

In No. 56, since the average cooling rate in the cooling step was slower than 20° C./second, needle-shaped martensite and preferable epitaxial ferrite around the martensite could not be obtained, and a desired increase in the yield point could not be obtained.

In No. 57, since the cooling stop temperature in the cooling step was higher than 500° C., needle-shaped martensite and preferable epitaxial ferrite around the martensite could not be obtained, and a desired increase in the yield point could not be obtained.

In No. 58, since the coiling temperature was higher than 500° C., needle-shaped martensite and preferable epitaxial ferrite around the martensite could not be obtained, and a desired increase in the yield point could not be obtained.

In No. 59, since the rolling reduction in the cold rolling step was larger than 30%, it was not possible to maintain the needle-like structure formed in the hot-rolled steel sheet, and a desired increase in the yield point could not be obtained.

In No. 60, since the soaking temperature in the annealing step was lower than (Ac3 point—100)° C., a desired metallographic structure could not be obtained, the tensile strength was not sufficient, and a desired increase in the yield point could not be obtained.

In No. 61, since the soaking temperature in the annealing step was higher than 900° C., a desired metallographic structure could not be obtained, it was not possible to maintain the needle-like structure formed in the hot-rolled steel sheet, and a desired increase in the yield point could not be obtained.

In No. 62, since the average cooling rate in the annealing cooling step was slower than 2.5° C./second, a desired metallographic structure could not be obtained, and the tensile strength was not sufficient.

In No. 63, since the average cooling rate in the annealing cooling step was faster than 50° C./second, epitaxial ferrite could not be sufficiently obtained, and a desired increase in the yield point could not be obtained.

INDUSTRIAL APPLICABILITY

According to the present invention, since it is possible to provide a steel sheet having a tensile strength of 980 MPa or more and having a preferable member rigidity even after bending and a manufacturing method thereof, the present invention is extremely useful industrially.

The invention claimed is:

1. A steel sheet comprising, as a chemical composition, in mass %,
   C: 0.050% or more and 0.500% or less,
   Si: 0.01% or more and 2.50% or less,
   Mn+Cr: 1.20% or more and 4.00% or less,
   Al: 0.10% or more and 2.00% or less,
   P: 0% or more and 0.100% or less,
   S: 0% or more and 0.050% or less,
   N: 0% or more and 0.010% or less,
   O: 0% or more and 0.006% or less,
   Mo: 0% or more and 1.000% or less,
   Ti: 0% or more and 0.200% or less,
   Nb: 0% or more and 0.200% or less,
   B: 0% or more and 0.010% or less,
   V: 0% or more and 0.200% or less,
   Cu: 0% or more and 1.000% or less,
   W: 0% or more and 0.100% or less,
   Ta: 0% or more and 0.100% or less,
   Ni: 0% or more and 1.000% or less,
   Sn: 0% or more and 0.050% or less,
   Co: 0% or more and 0.500% or less,
   Sb: 0% or more and 0.050% or less,
   As: 0% or more and 0.050% or less,
   Mg: 0% or more and 0.050% or less,
   Ca: 0% or more and 0.050% or less,
   Y: 0% or more and 0.050% or less,
   Zr: 0% or more and 0.050% or less,
   La: 0% or more and 0.050% or less,
   Ce: 0% or more and 0.050% or less, and
   a remainder consisting of Fe and impurities,
   wherein a metallographic structure at a position of ¼ of a sheet thickness from a surface includes, in volume percentage,
   ferrite and epitaxial ferrite: 10% or more and less than 50%,
   a proportion of the epitaxial ferrite in a total volume percentage of the ferrite and the epitaxial ferrite: 5% or more and 30% or less,
   martensite: 20% or more and 70% or less,
   bainite: 50% or less,
   residual austenite: 15% or less, and
   a remainder in microstructure: 5% or less,
   a total volume percentage of the bainite, the residual austenite and the remainder in microstructure is 50% or less,
   A/B, which is a ratio of a length A of an interface between the epitaxial ferrite and the ferrite to a length B of an interface between the epitaxial ferrite and the martensite in a cross section that is along a rolling direction and perpendicular to the surface at the position of ¼ of the sheet thickness from the surface, is more than 1.5,
   a ratio of a major axis to a minor axis of the martensite is 5.0 or more, and
   a tensile strength is 980 MPa or more.

2. The steel sheet according to claim 1 further comprising, as the chemical composition, in mass %, one or more selected from the group of:
   Mo: 0.010% to 1.000%,
   B: 0.0001% to 0.010%,
   Ti: 0.010% to 0.200%,
   Nb: 0.010% to 0.200%,
   V: 0.010% to 0.200%,
   Cu: 0.001% to 1.000%, and
   Ni: 0.001% to 1.000%.

3. The steel sheet according to claim 2,
   wherein a hot-dip galvanized layer is provided on the surface of the steel sheet.

4. The steel sheet according to claim 2,
   wherein a hot-dip galvannealed layer is provided on the surface of the steel sheet.

5. The steel sheet according to claim 2,
   wherein an electrogalvanized layer is provided on the surface of the steel sheet.

6. The steel sheet according to claim 1,
   wherein a hot-dip galvanized layer is provided on the surface of the steel sheet.

7. The steel sheet according to claim 1,
   wherein a hot-dip galvannealed layer is provided on the surface of the steel sheet.

8. The steel sheet according to claim 1,
   wherein an electrogalvanized layer is provided on the surface of the steel sheet.

9. A manufacturing method of the steel sheet of claim 1, comprising:
   a hot rolling step of hot-rolling a slab having a chemical composition containing, in mass %, C: 0.050% or more and 0.500% or less, Si: 0.01% or more and 2.50% or less, Mn+Cr: 1.20% or more and 4.00% or less, Al: 0.10% or more and 2.00% or less, P: 0% or more and 0.100% or less, S: 0% or more and 0.050% or less, N: 0% or more and 0.010% or less, 0: 0% or more and 0.006% or less, Mo: 0% or more and 1.000% or less, Ti: 0% or more and 0.200% or less, Nb: 0% or more and 0.200% or less, B: 0% or more and 0.010% or less, V: 0% or more and 0.200% or less, Cu: 0% or more and 1.000% or less, W: 0% or more and 0.100% or less, Ta: 0% or more and 0.100% or less, Ni: 0% or more and 1.000% or less, Sn: 0% or more and 0.050% or less, Co: 0% or more and 0.500% or less, Sb: 0% or more and 0.050% or less, As: 0% or more and 0.050% or less, Ca: 0% or more and 0.050% or less, Y: 0% or more and 0.050% or less, Zr: 0% or more and 0.050% or less, La: 0% or more and 0.050% or less, Ce: 0% or more and 0.050% or less, and a remainder consisting of Fe and impurities, to produce a hot-rolled steel sheet in which a prior austenite grain size is smaller than 30 μm;

a cooling step of cooling the hot-rolled steel sheet to 500° C. or lower at an average cooling rate of 20° C./second or faster;

a coiling step of coiling the hot-rolled steel sheet after the cooling step at 500° C. or lower;

a cold rolling step of pickling the hot-rolled steel sheet after the coiling step and cold-rolling the hot-rolled steel sheet at a rolling reduction of 30% or smaller to produce a cold-rolled steel sheet;

an annealing step of heating the cold-rolled steel sheet to a first temperature range of (Ac3 point−100° C.) to 900° C. and soaking the cold-rolled steel sheet in the first temperature range for five seconds or longer; and an annealing cooling step of cooling the cold-rolled steel sheet after the annealing step at an average cooling rate of 2.5° C./second to 50° C./second in a second temperature range of 750° C. to 550° C.;

thereby producing the steel sheet of claim 1.

10. The manufacturing method of the steel sheet according to claim 9, wherein the hot rolling step includes a finish rolling step of rolling the slab by continuously passing the slab through a plurality of rolling stands, wherein, in the finish rolling step, a rolling start temperature at a third rolling stand from a last rolling stand is 800° C. to 1000° C., in each of the last three rolling stands in the finish rolling step, the slab is rolled at a rolling reduction of larger than 10%, an interpass time between the individual rolling stands in the last three rolling stands in the finish rolling step is 3.0 seconds or shorter, and ($T_n - T_{n+1}$), which is a difference between an exiting-side temperature $T_n$ of the n-th rolling stand of the last three rolling stands and an entering-side temperature $T_{n+1}$ of the (n+1)-th rolling stand of the last three rolling stands in the finish rolling step, is larger than 10° C.

11. The manufacturing method of the steel sheet according to claim 10, wherein a hot-dip galvanizing layer is formed by immersing the cold-rolled steel sheet after the annealing cooling step in a hot-dip galvanizing bath.

12. The manufacturing method of the steel sheet according to claim 11, wherein the hot-dip galvanizing layer is alloyed in a temperature range of 300° C. to 600° C.

13. The manufacturing method of the steel sheet according to claim 9, wherein a hot-dip galvanizing layer is formed by immersing the cold-rolled steel sheet after the annealing cooling step in a hot-dip galvanizing bath.

14. The manufacturing method of the steel sheet according to claim 13, wherein the hot-dip galvanizing layer is alloyed in a temperature range of 300° C. to 600° C.

15. A steel sheet comprising, as a chemical composition, in mass %,

C: 0.050% or more and 0.500% or less,
Si: 0.01% or more and 2.50% or less,
Mn+Cr: 1.20% or more and 4.00% or less,
Al: 0.10% or more and 2.00% or less,
P: 0% or more and 0.100% or less,
S: 0% or more and 0.050% or less,
N: 0% or more and 0.010% or less,
O: 0% or more and 0.006% or less,
Mo: 0% or more and 1.000% or less,
Ti: 0% or more and 0.200% or less,
Nb: 0% or more and 0.200% or less,
B: 0% or more and 0.010% or less,
V: 0% or more and 0.200% or less,
Cu: 0% or more and 1.000% or less,
W: 0% or more and 0.100% or less,
Ta: 0% or more and 0.100% or less,
Ni: 0% or more and 1.000% or less,
Sn: 0% or more and 0.050% or less,
Co: 0% or more and 0.500% or less,
Sb: 0% or more and 0.050% or less,
As: 0% or more and 0.050% or less,
Mg: 0% or more and 0.050% or less,
Ca: 0% or more and 0.050% or less,
Y: 0% or more and 0.050% or less,
Zr: 0% or more and 0.050% or less,
La: 0% or more and 0.050% or less,
Ce: 0% or more and 0.050% or less, and
a remainder comprising Fe and impurities, wherein a metallographic structure at a position of ¼ of a sheet thickness from a surface includes, in volume percentage, ferrite and epitaxial ferrite: 10% or more and less than 50%, a proportion of the epitaxial ferrite in a total volume percentage of the ferrite and the epitaxial ferrite: 5% or more and 30% or less, martensite: 20% or more and 70% or less,
bainite: 50% or less,
residual austenite: 15% or less, and
a remainder in microstructure: 5% or less, a total volume percentage of the bainite, the residual austenite and the remainder in microstructure is 50% or less, A/B, which is a ratio of a length A of an interface between the epitaxial ferrite and the ferrite to a length B of an interface between the epitaxial ferrite and the martensite in a cross section that is along a rolling direction and perpendicular to the surface at the position of ¼ of the sheet thickness from the surface, is more than 1.5, a ratio of a major axis to a minor axis of the martensite is 5.0 or more, and a tensile strength is 980 MPa or more.

16. A manufacturing method of the steel sheet of claim 15, comprising:

a hot rolling step of hot-rolling a slab having a chemical composition containing, in mass %, C: 0.050% or more and 0.500% or less,
Si: 0.01% or more and 2.50% or less,
Mn+Cr: 1.20% or more and 4.00% or less,
Al: 0.10% or more and 2.00% or less,
P: 0% or more and 0.100% or less,
S: 0% or more and 0.050% or less,
N: 0% or more and 0.010% or less,
O: 0% or more and 0.006% or less,
Mo: 0% or more and 1.000% or less,
Ti: 0% or more and 0.200% or less,
Nb: 0% or more and 0.200% or less,
B: 0% or more and 0.010% or less,
V: 0% or more and 0.200% or less,
Cu: 0% or more and 1.000% or less,
W: 0% or more and 0.100% or less,
Ta: 0% or more and 0.100% or less, Sn: 0% or more and 0.050% or less,
Co: 0% or more and 0.500% or less,
Sb: 0% or more and 0.050% or less,
As: 0% or more and 0.050% or less,
Mg: 0% or more and 0.050% or less,
Ca: 0% or more and 0.050% or less,
Y: 0% or more and 0.050% or less,
Zr: 0% or more and 0.050% or less,
La: 0% or more and 0.050% or less,
Ce: 0% or more and 0.050% or less, and
a remainder comprising Fe and impurities, to produce a hot-rolled steel sheet in which a prior austenite grain size is smaller than 30 μm;
a cooling step of cooling the hot-rolled steel sheet to 500° C. or lower at an average cooling rate of 20° C./second or faster;
a coiling step of coiling the hot-rolled steel sheet after the cooling step at 500° C. or lower;
a cold rolling step of pickling the hot-rolled steel sheet after the coiling step and cold-rolling the hot-rolled steel sheet at a rolling reduction of 30% or smaller to produce a cold-rolled steel sheet;
an annealing step of heating the cold-rolled steel sheet to a first temperature range of (Ac3 point−100° C.) to 900° C. and soaking the cold-rolled steel sheet in the first temperature range for five seconds or longer; and
an annealing cooling step of cooling the cold-rolled steel sheet after the annealing step at an average cooling rate of 2.5° C./second to 50° C./second in a second temperature range of 750° C. to 550° C.;
thereby producing the steel sheet of claim 15.

* * * * *